(12) United States Patent
Hashirano et al.

(10) Patent No.: US 7,233,566 B2
(45) Date of Patent: Jun. 19, 2007

(54) FIVE-BY-THREE WAVELET TRANSFORM APPARATUS

(75) Inventors: Keigo Hashirano, Kanagawa (JP); Seigo Fukushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1054 days.

(21) Appl. No.: 10/374,633

(22) Filed: Feb. 26, 2003

(65) Prior Publication Data

US 2003/0161259 A1   Aug. 28, 2003

(30) Foreign Application Priority Data

Feb. 27, 2002   (JP) ............................ P2002-052040

(51) Int. Cl.
*H04J 11/00* (2006.01)
(52) U.S. Cl. ...................... 370/210; 370/203; 382/260; 375/240.18
(58) Field of Classification Search ..................... None
See application file for complete search history.

(56) References Cited

U.S. PATENT DOCUMENTS 6,873,734 B1 * 3/2005 Zandi et al. ............... 382/233

2001/0033620 A1 * 10/2001 Itokawa ................. 375/240.28

\* cited by examiner

*Primary Examiner*—Duc Ho
(74) *Attorney, Agent, or Firm*—Frommer Lawrence & Haug LLP; William S. Frommer

(57) ABSTRACT

In a 5×3 wavelet transform apparatus, a function-A module (11) calculates equations A1 and A2, a function-B module (12) calculates equations B1 and B2, function-C0 module (13) calculates an equation C0, and a function-C1 module (14) calculates an equation C1. Selectors have terminals thereof set to "1" for a forward transform, and to "0" for an inverse transform. The equations A1 and B1 are applied for reversible transform, and A2 and B2 are applied for irreversible transform. The aforementioned equations are as follows:

$A\text{out} = \text{RoundOff}\{(A\text{in}0 + A\text{in}1 + 0 \times 2000) >> 2\}$. A1

$A\text{out} = 0.25 * (A\text{in}0 + A\text{in}1)$. A2

$B\text{out} = \text{RoundOff}(B\text{in}0 + B\text{in}1)$. B1

$B\text{out} = 0.5 * (B\text{in}0 + B\text{in}1)$. B2

$C0\text{out} = C0\text{in}0 + C1\text{in}1$. C0

$C1\text{out} = C0\text{in}0 - C1\text{in}1$. C1.

27 Claims, 20 Drawing Sheets

FIVE-BY-THREE WAVELET TRANSFORM APPARATUS

BACKGROUND OF THE INVENTION

1. Field of the Invention

The present invention relates to a 5×3 wavelet transform apparatus used in JPEG 2000 or the like for example.

This application claims the priority of the Japanese Patent Application No. 2002-052040 filed on Feb. 27, 2002, the entirety of which is incorporated by reference herein.

2. Description of the Related Art

Recently, a still image compression method called JPEG 2000 (ISO/IEC JTC 1/SC 29/WG1) has been proposed. JPEG 2000 adopts a wavelet transform in which the 5×3 filter is lifted. In this method, a conversion for decomposition of original image data into low- and high-frequency components is called "forward transform" and a combination of such low- and high-frequency components into the original image is called "inverse transform".

Also, JPEG 2000 adopts reversible wavelet transform or irreversible wavelet transform, either of which the user can selectively adopt.

However, in case a JPEG 2000 encoder/decoder is built by making a 5×3 wavelet filter as a hardware or software, it is necessary to form a forward reversible transform module, inverse irreversible transform module and an inverse reversible transform module, which will lead to a larger circuit scale.

OBJECT AND SUMMARY OF THE INVENTION

It is therefore an object of the present invention to overcome the above-mentioned drawbacks of the related art by providing a 5×3 wavelet transform apparatus whose circuit scale is reduced.

The present invention provides a 5×3 wavelet transform apparatus for making a forward transform of an original data stream composed of a plurality of original data by breaking down the original data stream into a low-frequency data stream including low-frequency components of the original data stream and a high-frequency data stream including high-frequency components of the original data stream, as well as for making an inverse transform of the low- and high-frequency data streams by reversing the forward transform.

The above object can be attained by providing a 5×3 wavelet transform apparatus for making a forward transform of an original data stream composed of a plurality of original data by breaking down the original data stream into a low-frequency data stream including low-frequency components of the original data stream and a high-frequency data stream including high-frequency components of the original data stream, as well as for making an inverse transform of the low- and high-frequency data streams by reversing the forward transform, the apparatus including, according to the present invention, a first computation means supplied with data Ain0 and Ain1 to determine data Amiddle by computing an equation (1) which will be given later, generate data Aout with the decimal part of the data Amiddle taken as zero (0) and output the data Aout, a second computation means supplied with data Bin0 and Bin1 to determine data Bmiddle by computing an equation (2) which will be given later, generate data Bout with the decimal part of the data Bmiddle taken as zero (0) and output the data Bout, a third computation means supplied with data C0in0 and C0in1 to determine data C0out by computing an equation (3) which will be given later and output the data C0out, and a fourth computation means supplied with data C1in0 and C1in1 to determine data C1out by computing an equation (4) which will be given later and output the data C1out.

For the forward transform, the above 5×3 wavelet transform apparatus is supplied, in every two steps, with the original data stream from first to last data, the first computation means is supplied with the (M−1)th data in the high-frequency data stream as the data Ain0 and also the output data C1out from the fourth computation means as the data Ain1, the second computation means is supplied with the (L−1)th data in the original data stream as the data Bin0 and also the (L+1)th data in the original data stream as the data Bin1, the third computation means is supplied with the (L−1)th data in the original data stream as the data C0in0 and also the output data Aout from the first computation means as the data C0in1, the fourth computation means is supplied with the L-th data in the original data stream as the data C1in0 and also the output data Bout from the second computation means as the data C1in1, and the apparatus outputs the output data C1out from the fourth computation means as the M-th data in the high-frequency data stream and also the output data C0out from the third computation means as the N-th data in the low-frequency data stream.

For the inverse transform, the 5×3 wavelet transform apparatus is supplied, in each step, with the low- and high-frequency data streams from first to last data, the first computation means is supplied with the M-th data in the high-frequency data stream as the data Ain0 and also the (M+1)th data in the high-frequency data stream as the data Ain1, the second computation means is supplied with the (L−1)th data in the original data stream as the data Bin0 and also the output data C1out from the fourth computation means as the data Bin1, the third computation means is supplied with the M-th data in the high-frequency data stream as the data C0in0 and also the output data Bout from the second computation means as the data C0in1, the fourth computation means is supplied with the (N+1)th data in the low-frequency data stream as the data C1in0 and also the output data Aout from the first computation means as the data C1in1, and the apparatus outputs the output data C1out from the third computation means as the L-th data in the original data stream and also the output data C1out from the fourth computation means as the (L+1)th data in the original data stream.

The equations used in the 5×3 wavelet transform apparatus are as follows:

$$A\text{middle} = (A\text{in}0 + A\text{in}1 + \text{Coeff\_A})_2 >> 2 \tag{1}$$

$$B\text{middle} = (B\text{in}0 + B\text{in}1)_2 >> 1 \tag{2}$$

$$C0\text{out} = (C0\text{in}0 + C0\text{in}1) \tag{3}$$

$$C1\text{out} = (C1\text{in}0 + C1\text{in}1) \tag{4}$$

where $X_Y$ is a notation of X by a numeration based on Y, and $X_2 >> Y$ indicates an arithmetic Y-bit rightward shift of X (binary number).

Coeff_A is 2 (decimal number).

The values L, M and N are integers having a relation of $\{L=2M=2N\}$ or $\{(L+1)=2M=2(N+1)\}$ with each other.

Also the above object can be attained by providing a 5×3 wavelet transform apparatus for making a forward transform of an original data stream composed of a plurality of original data by breaking down the original data stream into a low-frequency data stream including low-frequency components of the original data stream and a high-frequency data stream including high-frequency components of the original data stream, as well as for making an inverse transform of the low- and high-frequency data streams by reversing the forward transform, the apparatus including, according to the present invention, a first computation means supplied with data Ain0 and Ain1 to determine data Amiddle by computing an equation (1') which will be given later and output the data Amiddle as the data Aout, a second computation means supplied with data Bin0 and Bin1 to determine data Bmiddle by computing an equation (2') which will be given later and output the data Bmiddle as the data Bout, a third computation means supplied with data C0in0 and C0in1 to determine data C0out by computing an equation (3) which will be given later and output the data C0out, and a fourth computation means supplied with data C1in0 and C1in1 to determine data C1out by computing an equation (4) which will be given later and output the data C1out.

For the forward transform, the above 5×3 wavelet transform apparatus is supplied, in every two steps, with the original data stream from first to last data, the first computation means is supplied with the (M−1)th data in the high-frequency data stream as the data Ain0 and also the output data C1out from the fourth computation means as the data Ain1, the second computation means is supplied with the (L−1)th data in the original data stream as the data Bin0 and also the (L+1)th data in the original data stream as the data Bin1, the third computation means is supplied with the (L−1)th data in the original data stream as the data C0in0 and also the output data Aout from the first computation means as the data C0in1, the fourth computation means is supplied with the L-th data in the original data stream as the data C1in0 and also the output data Bout from the second computation means as the data C1in1, and the apparatus outputs the output data C1out from the fourth computation means as the M-th data in the high-frequency data stream and also the output data C0out from the third computation means as the N-th data in the low-frequency data stream.

For the inverse transform, the 5×3 wavelet transform apparatus is supplied, in each step, with the low- and high-frequency data streams from first to last data, the first computation means is supplied with the M-th data in the high-frequency data stream as the data Ain0 and also the (M+1)th data in the high-frequency data stream as the data Ain1, the second computation means is supplied with the (L−1)th data in the original data stream as the data Bin0 and also the output data C1out from the fourth computation means as the data Bin1, the third computation means is supplied with the M-th data in the high-frequency data stream as the data C0in0 and also the output data Bout from the second computation means as the data C0in1, the fourth computation means is supplied with the (N+1)th data in the low-frequency data stream as the data C1in0 and also the output data Aout from the first computation means as the data C1in1, and the apparatus outputs the output data C1out from the third computation means as the L-th data in the original data stream and also the output data C1out from the fourth computation means as the (L+1)th data in the original data stream.

The equations used in the 5×3 wavelet transform apparatus are as follows:

$$A\text{middle}=0.25*(A\text{in}0+A\text{in}1) \quad (1')$$

$$B\text{middle}=0.5*(B\text{in}0+B\text{in}1) \quad (2')$$

$$C0\text{out}=(C0\text{in}0+C0\text{in}1) \quad (3)$$

$$C1\text{out}=(C1\text{in}0+C1\text{in}1) \quad (4)$$

The values L, M and N are integers having a relation of $\{L=2M=2N\}$ or $\{(L+1)=2M=2(N+1)\}$ with each other.

Also the above object can be attained by providing a 5×3 wavelet transform apparatus for making a forward transform of an original data stream composed of a plurality of original data to break down the original data stream into a low-frequency data stream including low-frequency components of the original data stream and a high-frequency data stream including high-frequency components of the original data stream, and for reversing the forward transform, the apparatus including, according to the present invention, a first computation means supplied with data Ain0 and Ain1 to determine data Amiddle by computing an equation (1) when in a reversible transform mode, while determining the data Amiddle by computing an equation (1") when in an irreversible transform mode, and output data Aout with the decimal part of the data Amiddle taken as zero (0) when in the reversible transform mode, while outputting the data Amiddle as it is as the data Aout when in the irreversible transform mode, a second computation means supplied with data Bin0 and Bin1 to determine data Bmiddle by computing an equation (2) which will be given later, and output data Bout with the decimal part of the data Bmiddle taken as zero (0) when in the reversible transform mode, while outputting the data Bmiddle as it is as the data Bout when in the irreversible transform mode, a third computation means supplied with data C0in0 and C0in1 to determine data C0out by computing an equation (3) which will be given later and output the data C0out, and a fourth computation means supplied with data C1in0 and C1in1 to determine data C1out by computing an equation (4) which will be given later and output the data C1out.

For the forward transform, the above 5×3 wavelet transform apparatus is supplied, in every two steps, with the original data stream from first to last data, the first computation means is supplied with the (M−1)th data in the high-frequency data stream as the data Ain0 and also the output data C1out from the fourth computation means as the data Ain1, the second computation means is supplied with the (L−1)th data in the original data stream as the data Bin0 and also the (L+1)th data in the original data stream as the data Bin1, the third computation means is supplied with the (L−1)th data in the original data stream as the data C0in0 and also the output data Aout from the first computation means as the data C0in1, the fourth computation means is supplied with the L-th data in the original data stream as the data C1in0 and also the output data Bout from the second computation means as the data C1in1, and the apparatus outputs the output data C1out from the fourth computation means as the M-th data in the high-frequency data stream and also the output data C0out from the third computation means as the N-th data in the low-frequency data stream.

For the inverse transform, the 5×3 wavelet transform apparatus is supplied, in each step, with the low- and high-frequency data streams from first to last data, the first computation means is supplied with the M-th data in the high-frequency data stream as the data Ain0 and also the (M+1)th data in the high-frequency data stream as the data Ain1, the second computation means is supplied with the (L−1)th data in the original data stream as the data Bin0 and also the output data C1out from the fourth computation means as the data Bin1, the third computation means is supplied with the M-th data in the high-frequency data stream as the data C0in0 and also the output data Bout from the second computation means as the data C0in1, the fourth computation means is supplied with the (N+1)th data in the low-frequency data stream as the data C1in0 and also the output data Aout from the first computation means as the data C1in1, and the apparatus outputs the output data C1out from the third computation means as the L-th data in the original data stream and also the output data C1out from the fourth computation means as the (L+1)th data in the original data stream.

The equations used in the 5×3 wavelet transform apparatus are as follows:

$$A\text{middle}=(A\text{in}0+A\text{in}1+\text{Coeff}\_A)_2>>2 \quad (1)$$

$$A\text{middle}=(A\text{in}0+A\text{in}1)_2>>2 \quad (1'')$$

$$B\text{middle}=(B\text{in}0+B\text{in}1)_2>>1 \quad (2)$$

$$C0\text{out}=(C0\text{in}0+C0\text{in}1) \quad (3)$$

$$C1\text{out}=(C1\text{in}0+C1\text{in}1) \quad (4)$$

where $X_Y$ is a notation of X by a numeration based on Y, and $X_2>>Y$ indicates an arithmetic Y-bit rightward shift of X (binary number).

Coeff_A is 2 (decimal number).

The values L, M and N are integers having a relation of $\{L=2M=2N\}$ or $\{(L+1)=2M=2(N+1)\}$ with each other.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

5×3 Wavelet Transform

Figure 1:
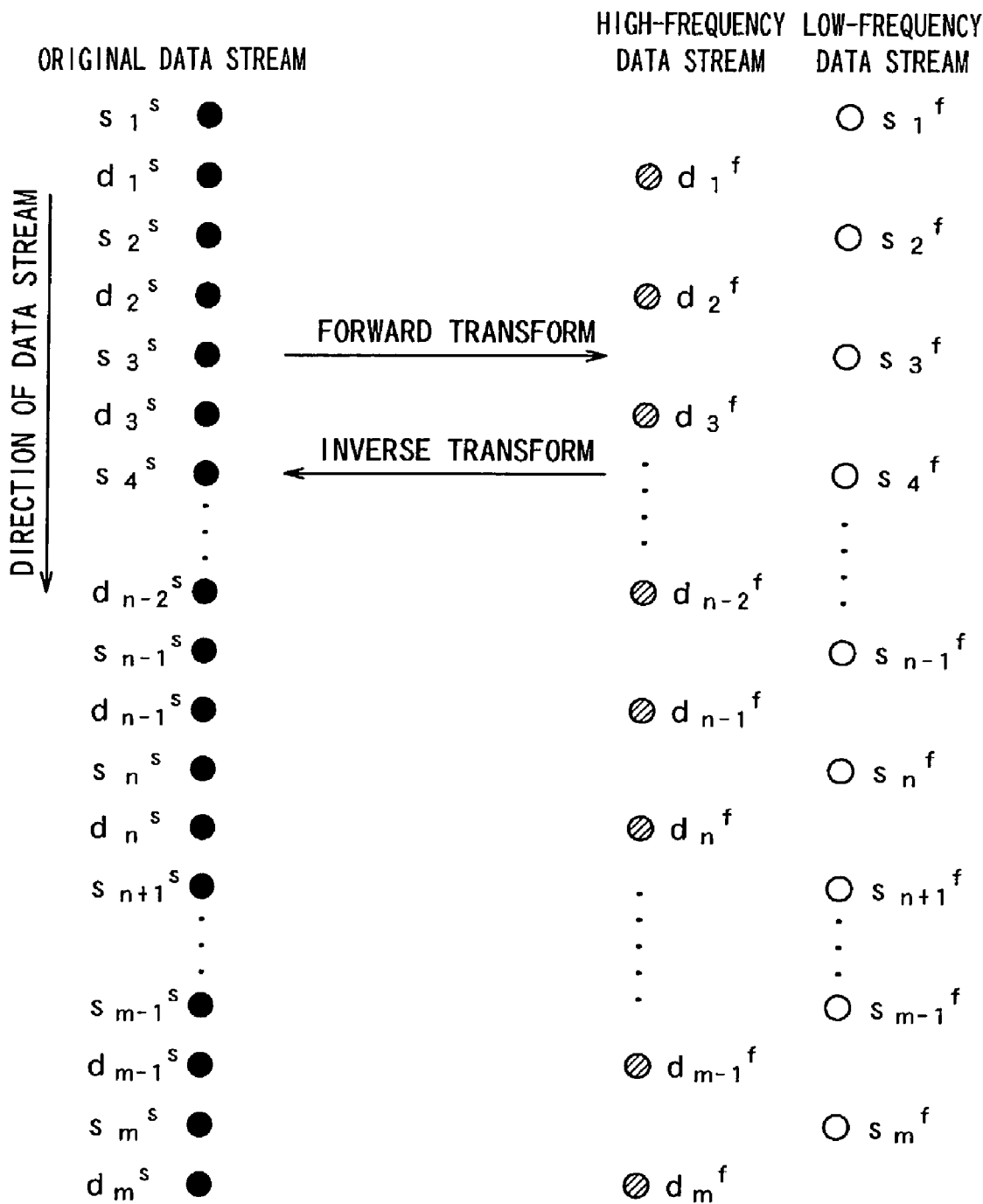
FIG. 1 explains the wavelet transform.

As shown in FIG. 1, the forward 5×3 wavelet transform is to break down an original data stream composed of one-dimensionally listed pixel data (or coefficients) into high- and low-frequency components and generate a data stream composed of high-frequency coefficients and a data stream composed of low-frequency coefficients. The inverse 5×3 wavelet transform is to reverse the forward transform. That is, the inverse transform is to combine the data stream of high-frequency coefficients and data stream of low-frequency coefficients together into generate the original data stream. It should be noted that each of the numbers of the high and low-frequency coefficients is ½ when the total number of original pixels (or coefficients) is even. Also, when the number of pixels is odd, one of the numbers of high- and low-frequency frequencies, respectively, is a number resulting from round-up of the decimal part of ½, while the other is a number resulting from round-down of the decimal part of ½.

A data stream yet to undergo forward transform will be referred to as "original data stream" herein. Also, a data stream composed of high-frequency coefficients after having undergone the forward transform will be referred to as "high-frequency data stream" herein and a data stream composed of low-frequency coefficients having also undergone the forward transform will be referred to as "low-frequency data stream" herein. Further, each of pixels (or coefficients) in the original data stream and each of coefficients included in the high- and low-frequency data streams will be represented as follows:

The high-frequency coefficient is represented by "$d_n^j$" in which the subscript "n" indicates a position (order) of the high-frequency coefficient in the high-frequency data stream from the top and is an arbitrary natural number larger than 1.

The low-frequency coefficient is represented by "$s_n^j$" in which the subscript "n" indicates a position (order) of the low-frequency coefficient in the low-frequency data stream from the top and is an arbitrary natural number larger than 1.

Original data are represented by "$s_n^s$" and "$d_n^s$". "$s_n^s$" is a pixel (or coefficient) in a pixel position corresponding to "$s_n^f$" and "$d_n^s$" is a pixel (or coefficient) in a pixel position corresponding to "$d_n^f$". Also, "$s_n^s$" is an odd pixel (or coefficient) in an original data stream and "$d_n^s$" is an even pixel (or coefficient) in the original data stream. Therefore, the position (order) of "$s_n^s$" in the original data stream is the (2n−1)th and the position (order) of "$d_n^s$" in the original data stream is the 2n-th.

Next, the 5×3 wavelet transform in each of the directions, forward and inverse, will be described. It should be noted that for the convenience of the explanation of the wavelet transform, it will be assumed that each data in a data stream is expressed in the binary notation. Also, it should be noted that in the computing equation, the X>>Y indicates an arithmetic Y-bit rightward shift of X (binary number).

Forward Reversible Wavelet Transform

The 5×3 forward reversible wavelet transform uses a 5×3 forward reversible filtering computation to generate one high-frequency coefficient and one low-frequency coefficient. In this 5×3 forward reversible wavelet transform, the 5×3 forward reversible filtering computation is sequentially done of data from first to last pixels of an original data stream to generate a high-frequency data stream and low-frequency data stream. More particularly, in the 5×3 forward reversible wavelet transform, the 5×3 forward reversible filtering computation is made of the original data stream stepwise by two data to generate the high- and low-frequency data streams.

Figure 2:
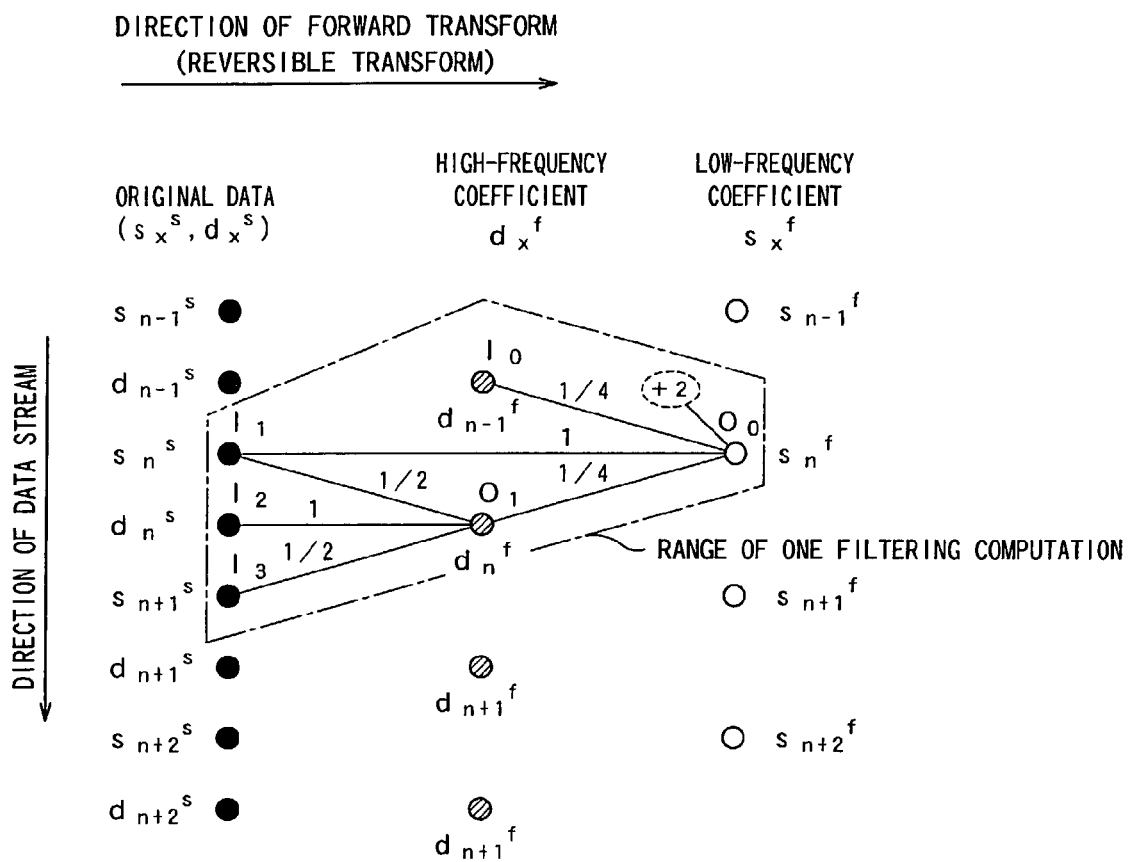
FIG. 2 explains the forward reversible wavelet transform.

FIG. 2 schematically illustrates the 5×3 forward reversible filtering computation for determination of an n-th high-frequency coefficient "$d_n^f$" and n-th low-frequency coefficient "$s_n^f$".

In the 5×3 forward reversible filtering computation, "$d_n^f$" and "$s_n^f$" are determined by computing the following equations, respectively:

$$s_n^f = s_n^s + \{(d_{n-1}^f + d_n^f + 2) >> 2\}$$

$$d_n^f = d_n^s - \{(s_n^s + s_{n+1}^s) >> 1\}$$

where $d_{n-1}^f$ is a value determined by the 5×3 forward reversible filtering computation in a preceding step.

On the assumption that $d_{n-1}^f = I_0$, $s_n^s = I_1$, $d_n^s = I_2$, $s_{n+1}^s = I_3$, $s_n^f = O_0$ and $d_n^f = O_1$, the above equations can be changed to the following ones (1-1) and (1-2), respectively:

$$O_0 = I_1 + \{(I_0 + O_1 + 2) >> 2\} \quad (1\text{-}1)$$

$$O_1 = I_2 - \{(I_1 + I_3) >> 1\} \quad (1\text{-}2)$$

Inverse Reversible Wavelet Transform

The 5×3 inverse reversible wavelet transform uses a 5×3 inverse reversible filtering computation to generate two original pixel (or coefficient) data. In this 5×3 inverse reversible wavelet transform, the 5×3 inverse reversible filtering computation is sequentially made of data from first to last coefficients to generate the original data stream. More particularly, in the 5×3 inverse reversible wavelet transform, 5×3 inverse reversible filtering computation is made of the high- and low-frequency data streams stepwise by one data to generate the original data stream.

Figure 3:
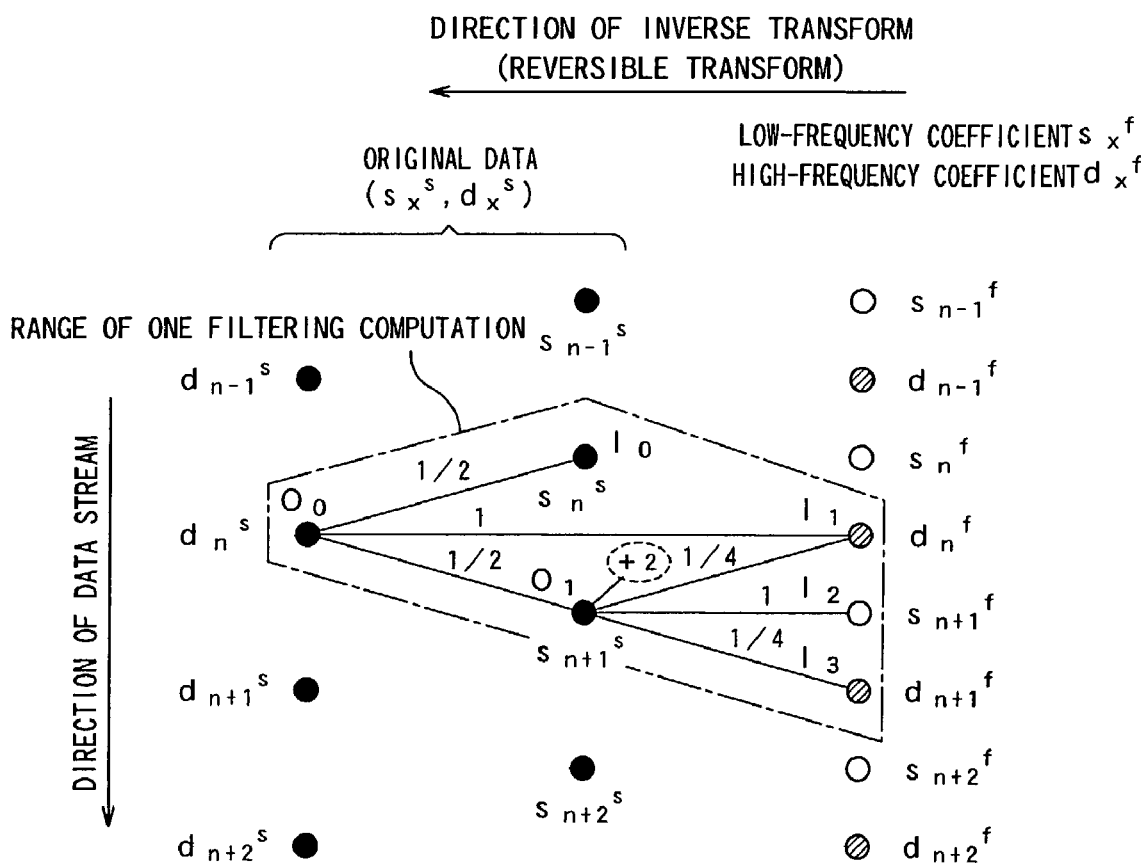
FIG. 3 explains the inverse reversible wavelet transform.

FIG. 3 schematically illustrates the 5×3 inverse reversible filtering computation to determine the 2n-th original data "$d_n^s$" and (2n+1)th original data "$s_{n+1}^s$".

In the 5×3 inverse reversible filtering computation, "$d_n^s$" and "$s_{n+1}^s$" are determined by computing the following equations, respectively:

$$d_n^s = d_n^f + \{(s_n^s + s_{n+1}^s) >> 1\}$$

$$s_{n+1}^s = s_{n+1}^f - \{(d_n^f + d_{n+1}^f + 2) >> 2\}$$

where $s_n^s$ is a value determined by the 5×3 inverse reversible filtering computation in a preceding step.

On the assumption that $s_n^s = I_0$, $d_n^f = I_1$, $s_{n+1}^f = I_2$, $d_{n+1}^f = I_3$, $d_n^s = O_0$ and $s_{n+1}^s = O_1$, the above equations can be changed to the following ones (2-1) and (2-2), respectively:

$$O_0 = I_1 + \{(I_0 + O_1) >> 1\} \quad (2\text{-}1)$$

$$O_1 = I_2 - \{(I_1 + I_3 + 2) >> 2\} \quad (2\text{-}2)$$

Forward Irreversible Wavelet Transform

The 5×3 forward irreversible wavelet transform uses a 5×3 forward irreversible filtering computation to generate one high-frequency coefficient and one low-frequency coefficient. In this 5×3 forward irreversible wavelet transform, the 5×3 forward irreversible filtering computation is sequentially done of data from first to last pixels to generate a high-frequency data stream and low-frequency data stream. More particularly, in the 5×3 forward irreversible wavelet transform, the 5×3 forward irreversible filtering computation is made of the original data stream stepwise by two data to generate the high- and low-frequency data streams.

Figure 4:
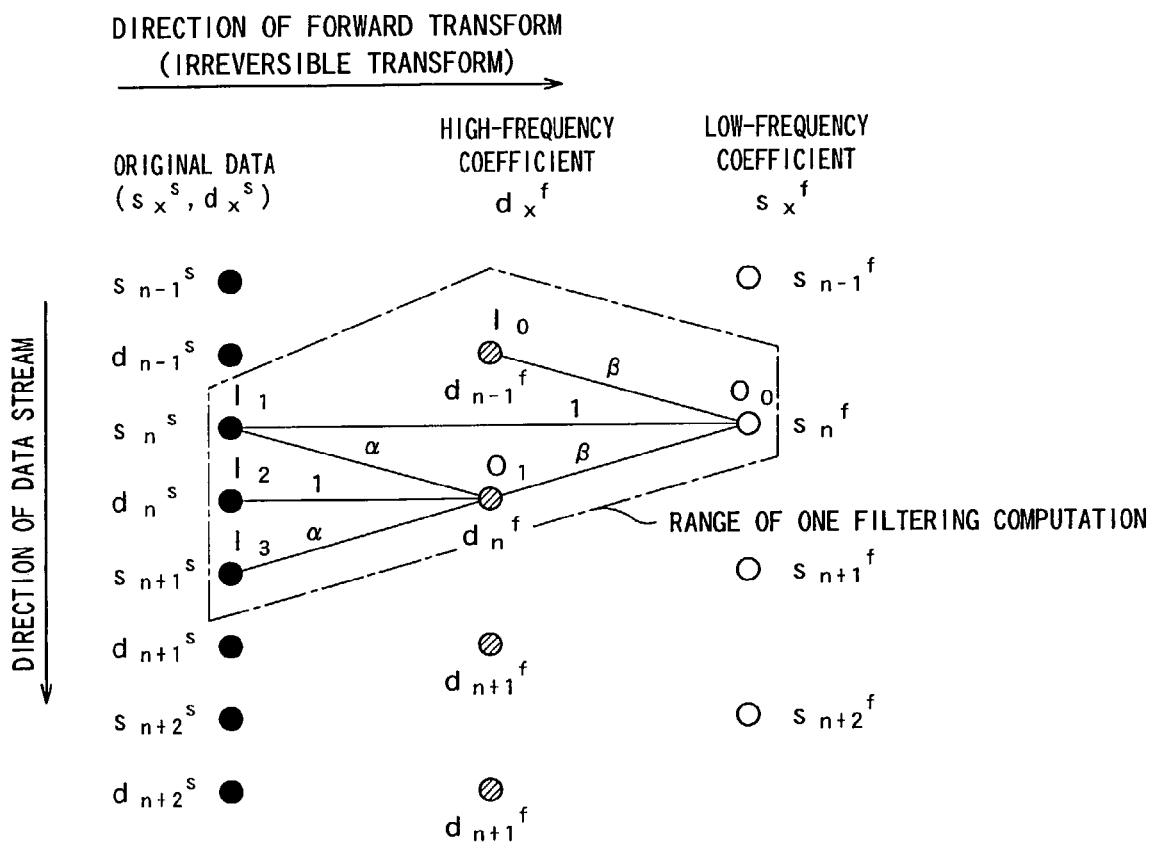
FIG. 4 explains the forward irreversible wavelet transform.

FIG. 4 schematically illustrates the 5×3 forward irreversible filtering computation for determination of an n-th high-frequency coefficient "$d_n^f$" and n-th low-frequency coefficient "$s_n^f$".

In the 5×3 forward irreversible filtering computation, "$d_n^f$" and "$s_n^f$" are determined by computing the following equations, respectively:

$$s_n^f = s_n^s + \beta \times (d_{n-1}^f + d_n^f)$$

$$d_n^f = d_n^s - \alpha \times (s_n^s + s_{n+1}^s)$$

where $\alpha = 0.5$, $\beta = 0.25$ and $d_{n-1}^f$ is a value determined by the 5×3 forward irreversible filtering computation in a preceding step.

On the assumption that $d_{n-1}^f = I_0$, $s_n^s = I_1$, $d_n^s = I_2$, $s_{n+1}^s = I_3$, $s_n^f = O_0$ and $d_n^f = O_1$, the above equations can be changed to the following ones (3-1) and (3-2), respectively:

$$O_0 = I_1 + \beta \times (I_0 + O_1) \quad (3\text{-}1)$$

$$O_1 = I_2 - \alpha \times (I_1 + I_3) \quad (3\text{-}2)$$

Inverse Irreversible Wavelet Transform

The 5×3 inverse irreversible wavelet transform uses a 5×3 inverse irreversible filtering computation to generate two original pixel (or coefficient) data. In this 5×3 inverse irreversible wavelet transform, the 5×3 inverse irreversible filtering computation is sequentially made of data from first to last coefficients to generate the original data stream. More particularly, in the 5×3 inverse irreversible wavelet transform, 5×3 inverse irreversible filtering computation is made of the high- and low-frequency data streams stepwise of one data to generate the original data stream.

Figure 5:
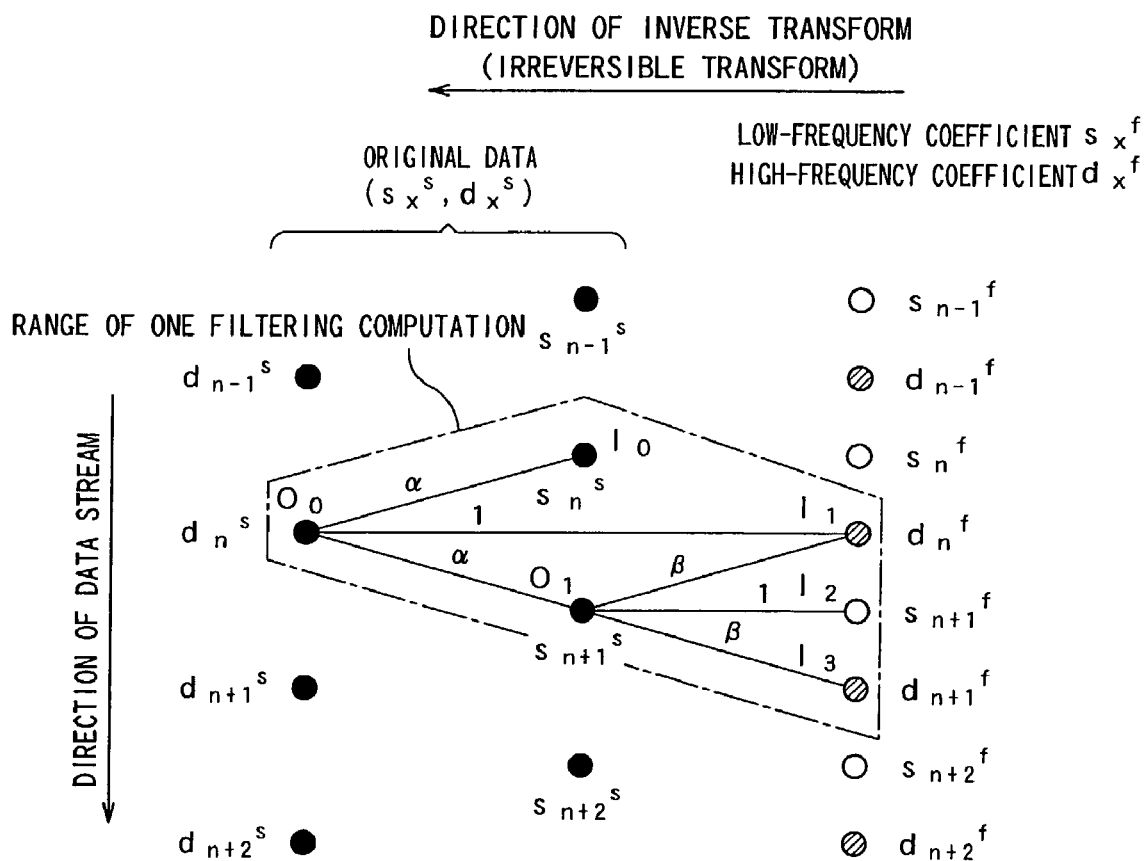
FIG. 5 explains the inverse irreversible wavelet transform.

FIG. 5 schematically illustrates the 5×3 inverse irreversible filtering computation to determine the 2n-th original data "$d_n^s$" and (2n+1)th original data "$s_{n+1}^s$".

In the 5×3 inverse irreversible filtering computation, "$d_n^s$" and "$s_{n+1}^s$" are determined by computing the following equations, respectively:

$$d_n^s = d_n^f + \alpha \times (s_n^s + s_{n+1}^s)$$

$$s_{n+1}^s = s_{n+1}^f - \beta \times (d_n^f + d_{n+1}^f)$$

where $s_n^s$ is a value determined by the 5×3 inverse irreversible filtering computation in a preceding step.

On the assumption that $s_n^s = I_0$, $d_n^f = I_1$, $s_{n+1}^f = I_2$, $d_{n+1}^f = I_3$, $d_n^s = O_0$ and $s_{n+1}^s = O_1$, the above equations can be changed to the following ones (4-1) and (4-2), respectively:

$$O_0 = I_1 + \alpha \times (I_0 + O_1) \quad (4\text{-}1)$$

$$O_1 = I_2 - \beta \times (I_1 + I_3) \quad (4\text{-}2)$$

Symmetrical Dilation

Next, how data in the trailing portion of a data stream is generated will be described.

Figure 6:
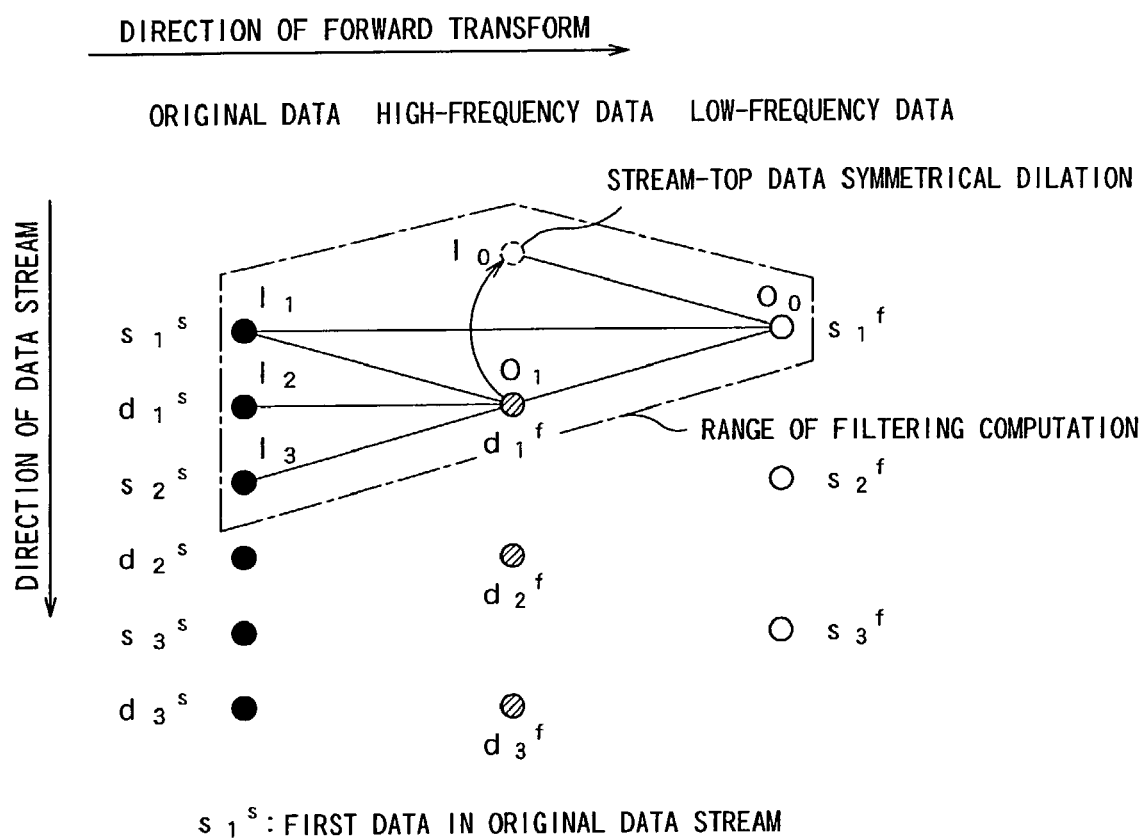
FIG. 6 explains a stream-top data symmetrical dilation in the forward transform.

In case a first coefficient ($s_1^f$) in the low-frequency data stream is generated by the 5×3 forward reversible wavelet transform or forward irreversible wavelet transform, there exists no data $I_0$ (high-frequency coefficient $d_0^f$) to which the filter has to refer, as shown in FIG. 6. Therefore, for generation of the first low-frequency coefficient in the 5×3 forward wavelet transform, data $O_1$ (high-frequency coefficient $d_1^f$) is placed at the data $I_0$ for filtering computation. The data in the leading portion of the data stream is dilated to a value to which the filter refers, which is called "stream-top data dilation"

Figure 7:
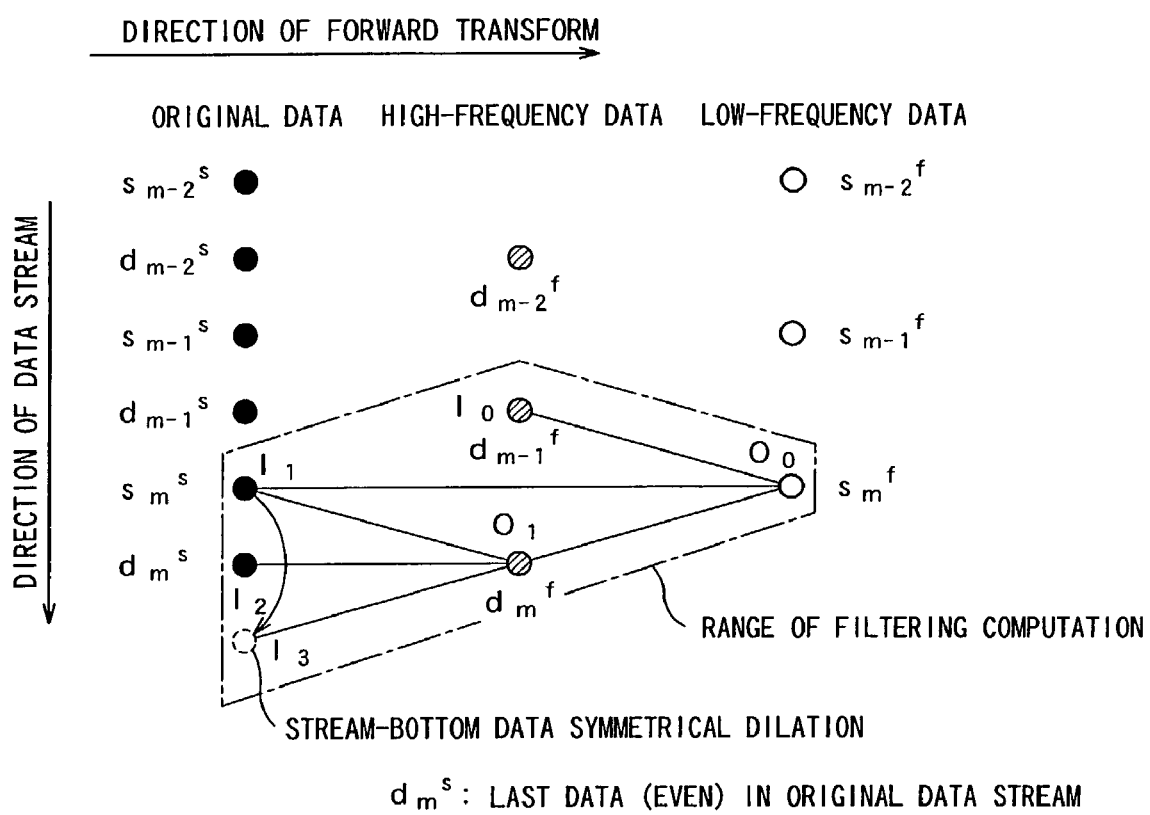
FIG. 7 explains a stream-bottom data symmetrical dilation in the forward transform made in case a total number of original data is even.

In case a last high-frequency coefficient ($d_m^f$) in the high-frequency data stream is generated using an original data stream whose total number of pixel data is even, there exists no data $I_3$ (original data $S_{m+1}^s$) to which the filter has to refer, as shown in FIG. 7. Therefore, for generation of the last high-frequency coefficient in the 5×3 forward wavelet transform, data $I_1$ (original data $S_m^s$) is placed at the data $I_3$ for filtering computation. The data in the trailing portion of the data stream is dilated to a value to which the filter refers, which is called "stream-bottom data dilation".

Figure 8:
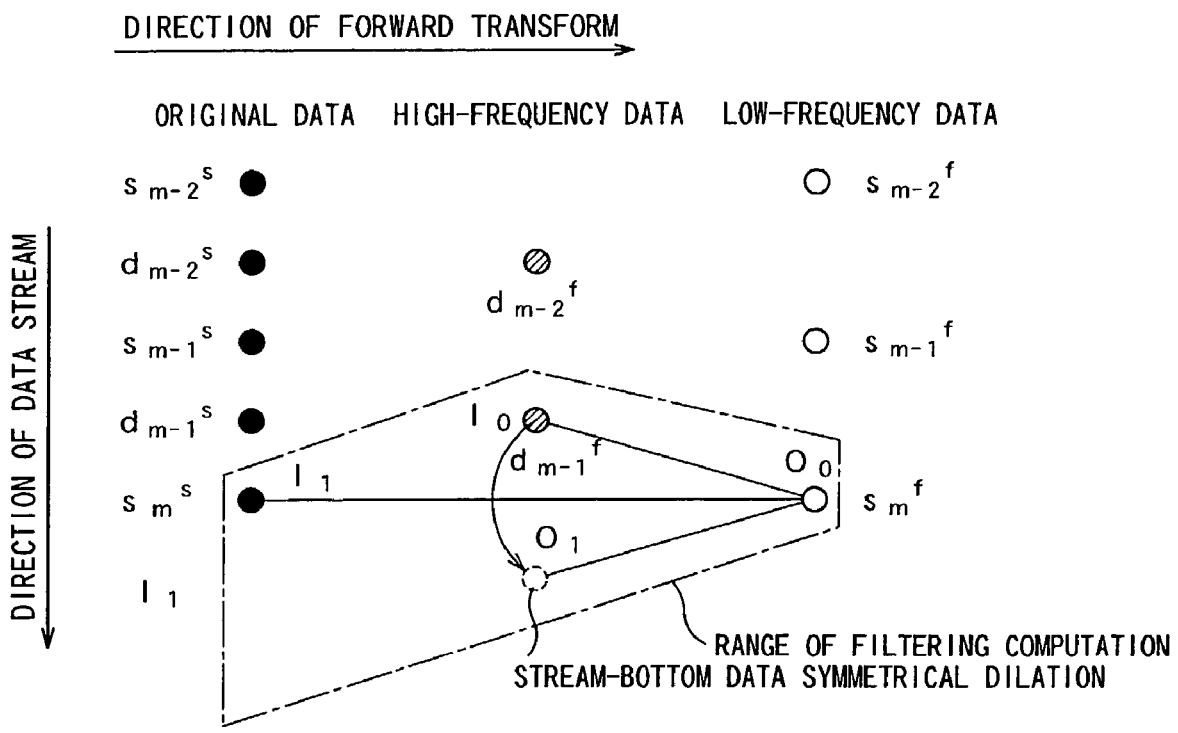
FIG. 8 explains a stream-bottom data symmetrical dilation in the forward transform made in case a total number of original data is odd.

In case a last low-frequency coefficient ($S_m^f$) in the low-frequency data stream is generated using an original data stream whose total number of pixel data is odd, there exists no data $O_1$ (high-frequency coefficient $d_m^s$) to which the filter has to refer, as shown in FIG. 8. Therefore, for generation of the last low-frequency coefficient in the 5×3 forward wavelet transform, data $I_0$ (high-frequency coefficient $d_{m+1}^f$) is placed at the data $O_1$ for filtering computation.

Figure 9:
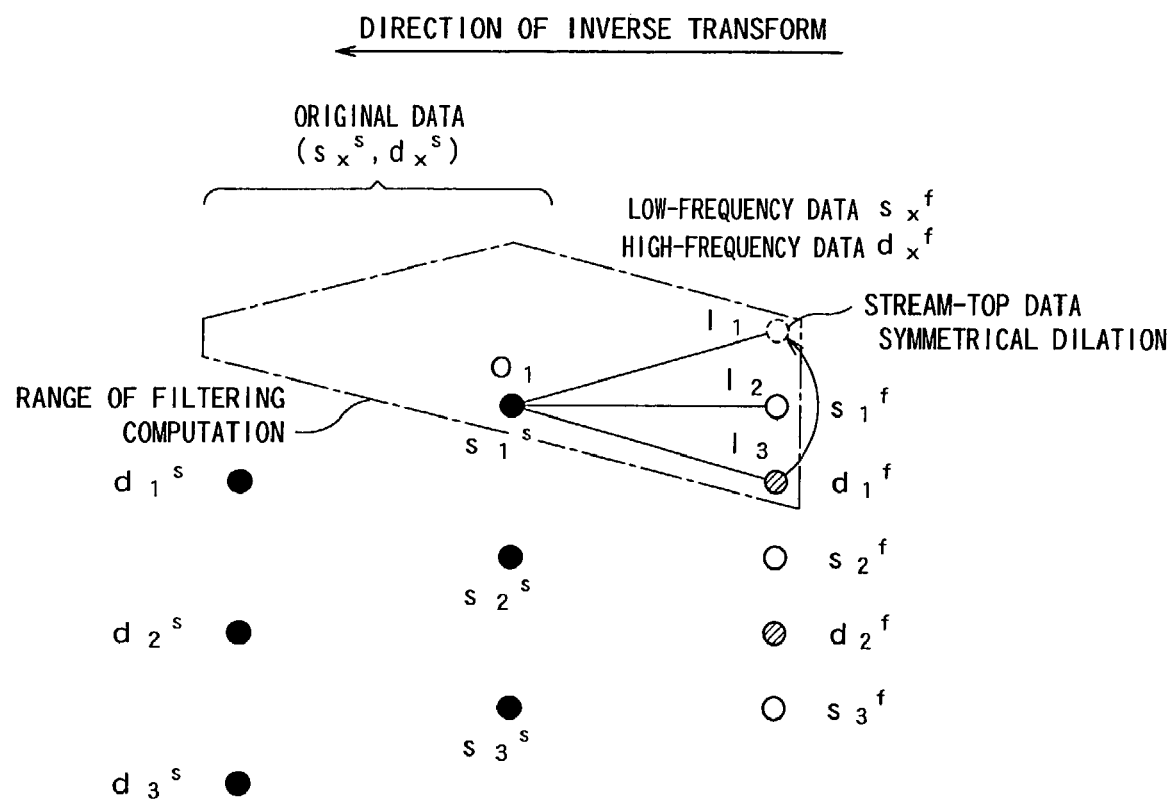
FIG. 9 explains a stream-top data symmetrical dilation in the inverse transform.

In case a first original data ($s_1^s$) in the original data stream is generated by the 5×3 inverse irreversible wavelet transform or inverse irreversible wavelet transform, there exists no data $I_1$ (high-frequency coefficient $d_0^f$) to which the filter has to refer, as shown in FIG. 9. Therefore, for generation of the first original data in the 5×3 inverse wavelet transform, data $I_3$ (high-frequency coefficient $d_1^f$) is placed at the data $I_1$ for filtering computation.

Figure 10:
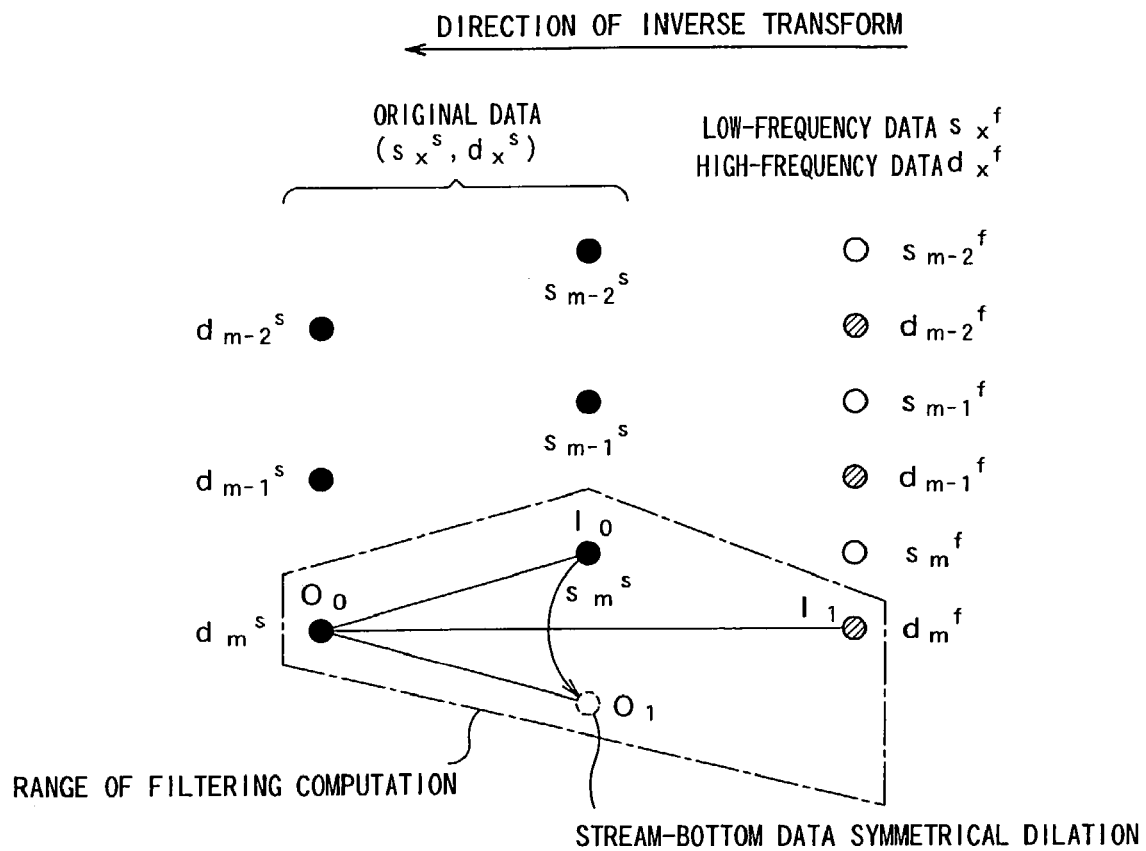
FIG. 10 explains a stream-bottom data symmetrical dilation in the inverse transform made in case a total number of original data is even.

In case a last original data ($d_m^s$) in the original data stream is generated using high- and low-frequency data streams, of which total numbers of high- and low-frequency coefficient data are even, there exists no data $O_1$ (original data $S_{m+1}^s$) to which the filter has to refer, as shown in FIG. 10. Therefore, for generation of the last original data ($d_m^s$) in the 5×3 inverse wavelet transform, data $I_0$ (original data $S_m^s$) is placed at the data $O_1$ for filtering computation.

Figure 11:
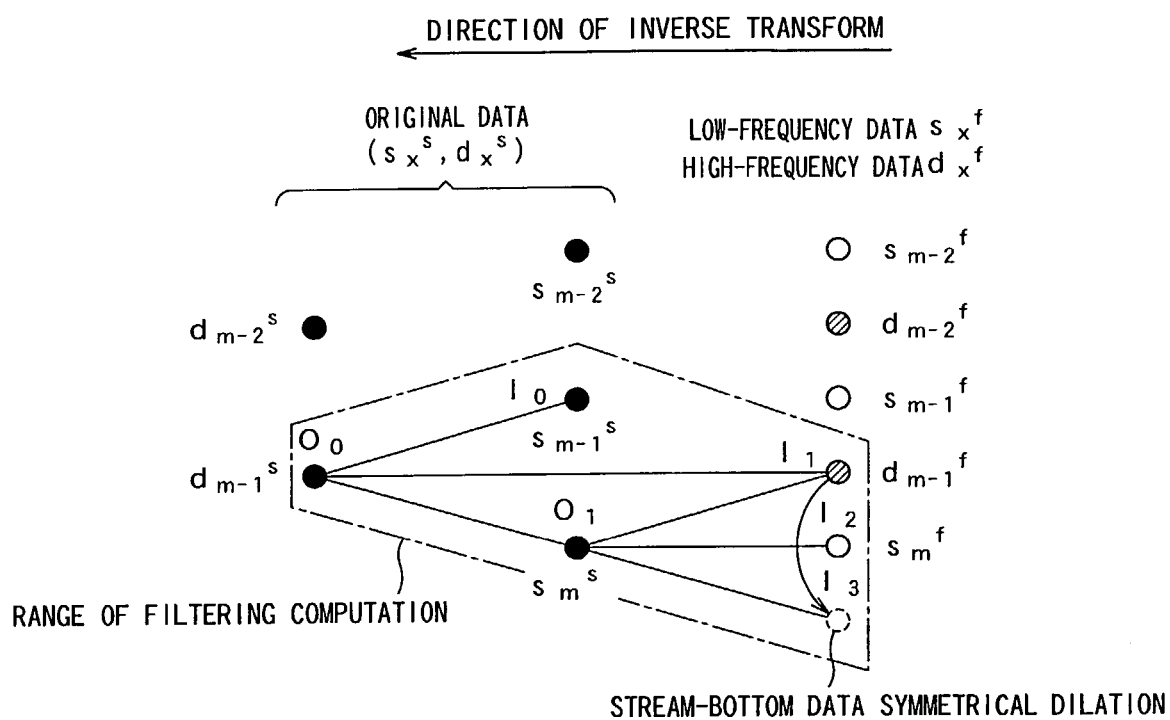
FIG. 11 explains a stream-bottom data symmetrical dilation in the forward transform made in case a total number of original data is odd.

In case a last original data ($s_m^s$) in the original data stream is generated using high- and low-frequency data streams, of which total numbers of high- and low-frequency coefficient data are odd, there exists no data $I_3$ (high-frequency coefficient $d_m^f$) to which the filter has to refer, as shown in FIG. 11. Therefore, for generation of the last original data ($s_m^s$) in the 5×3 inverse wavelet transform, data $I_1$ (high-frequency coefficient $d_{m-1}^f$) is placed at the data $I_3$ for filtering computation.

Wavelet Transform Apparatus

Next, the 5×3 wavelet transform apparatus according to the present invention will be described. It should be noted that for the convenience of the explanation of the 5×3 wavelet transform apparatus, it will be assumed that each of an original data and high- and low-frequency coefficients is binary data having a width of 32 bits whose MSB is a code bit, lower 12 bits form a decimal part and remaining 19 bits form an integer part. Also it should be noted that the data bus used in the 5×3 wavelet transform apparatus has a width of 32 bits unless otherwise specified.

Figure 12:
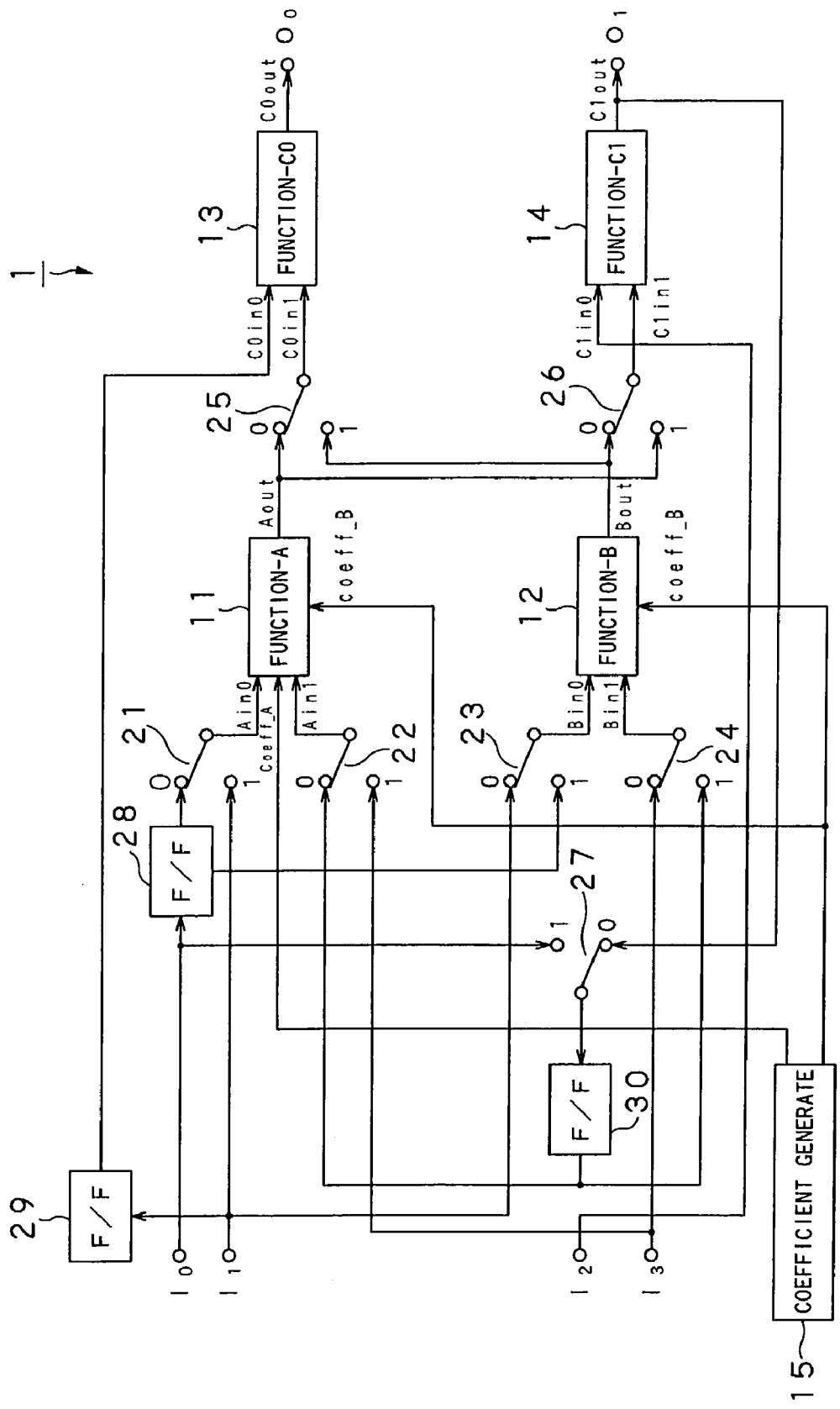
FIG. 12 is a circuit diagram of the wavelet transform apparatus.

FIG. 12 is a circuit diagram of a wavelet transform apparatus.

The wavelet transform apparatus is generally indicated with a reference 1. As shown in FIG. 12, the wavelet transform apparatus 1 includes a function-A module 11, function-B module 12, function-$C_0$ module 13, function-$C_1$ module 14, coefficient generation module 15, first to seventh selectors 21 to 27, and first to third flip-flops (F/F) 28 to 30.

Also the wavelet transform apparatus 1 has input terminals $I_0$, $I_1$, $I_2$ and $I_3$. These input terminals $I_0$, $I_1$, $I_2$ and $I_3$ are supplied with $I_0$, $I_1$, $I_2$ and $I_3$, respectively, corresponding to the aforementioned equations (1-1) and (1-2) in the forward reversible transform, $I_0$, $I_1$, $I_2$ and $I_3$, respectively, corresponding to the aforementioned equations (2-1) and (2-2) in the inverse reversible transform, $I_0$, $I_1$, $I_2$ and $I_3$, respectively, corresponding to the aforementioned equations (3-1) and (3-2) in the forward irreversible transform, and $I_0$, $I_1$, $I_2$ and $I_3$, respectively, corresponding to the aforementioned equations (4-1) and (4-2) in the inverse irreversible transform.

Also the wavelet transform apparatus 1 has output terminals $O_0$ and $O_1$. The output terminals $O_0$ and $O_1$ provide outputs $O_0$ and $O_1$, respectively, corresponding to the aforementioned equations (1-1) and (1-2) in the forward reversible transform, $O_0$ and $O_1$, respectively, corresponding to the aforementioned equations (2-1) and (2-2) in the inverse reversible transform, $O_0$ and $O_1$, respectively, corresponding to the aforementioned equations (3-1) and (3-2) in the forward irreversible transform, and $O_0$ and $O_1$, respectively, corresponding to the aforementioned equations (4-1) and (4-2) in the inverse irreversible transform.

Function-A Module

Figure 13:
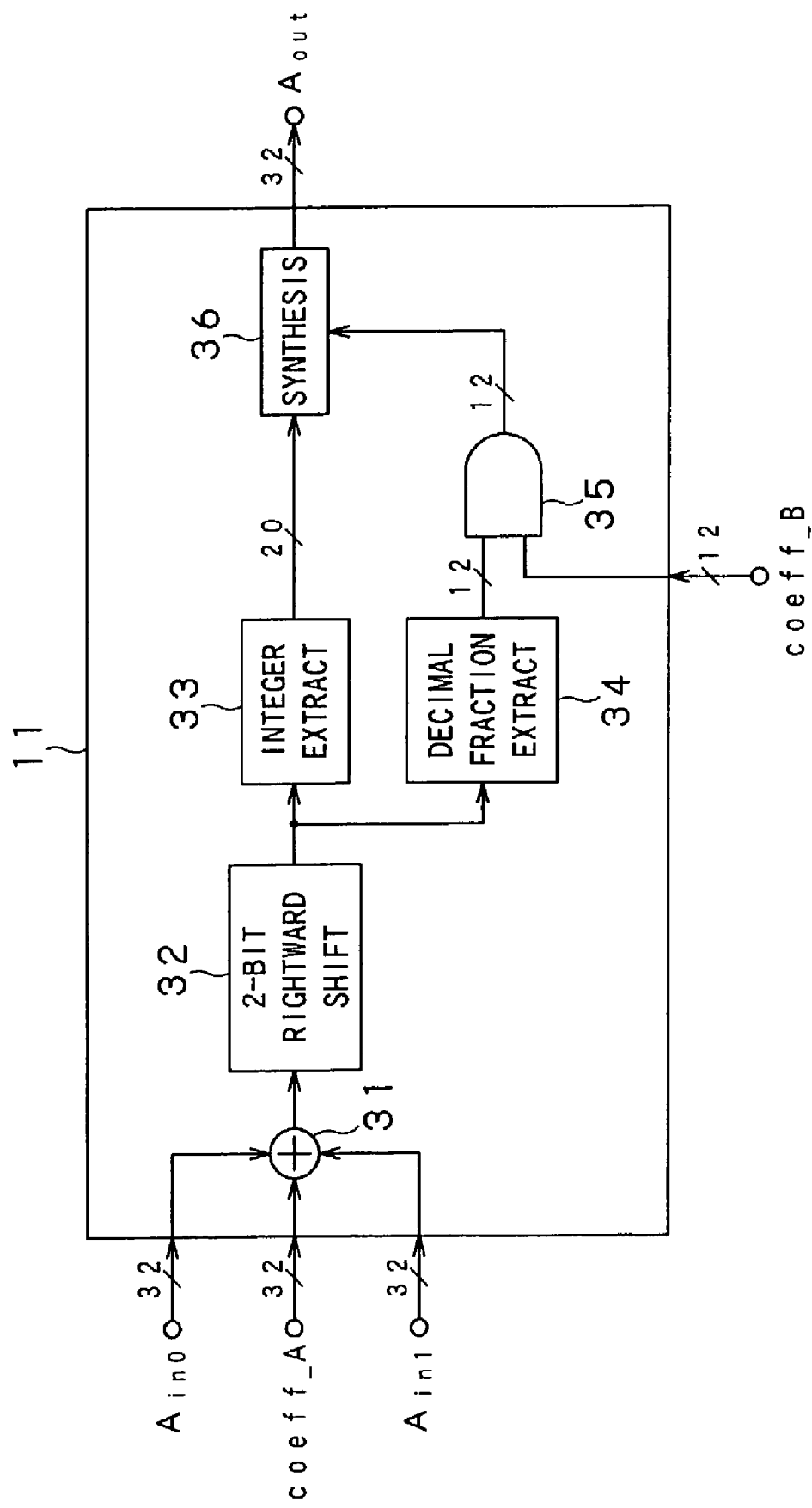
FIG. 13 is a circuit diagram of a function-A module.

The function-A module 11 is internally constructed as shown in the circuit diagram in FIG. 13.

As shown, the function-A module 11 includes an adder 31, 2-bit rightward shift circuit 32, integer extraction circuit 33, decimal fraction extraction circuit 34, AND circuit 35 and a synthesis circuit 36.

Also, the function-A module II has terminals Ain0, Ain1, Coeff_A and Coeff_B to which data Ain0, Ain1, Coeff_A and Coeff_B are externally supplied, respectively. Each of the data Ain0, Ain1 and Coeff_A is a 32 bit-long data. The data Coeff_B is a 12 bit-long data.

The adder 31 adds the data Ain0, Ain1 and Coeff_A to provide 32-bit data. That is, the adder 31 makes an addition of (Ain0+Ain1+Coeff_A). The data Coeff_A is a coefficient originated from the coefficient generation module 15. The data Coeff_A is made 2 (decimal) when in the reversible transform mode. That is, in this embodiment, since the lower 12 bits represent a decimal number, the data Coeff_A is "0x2000" as a hexadecimal notation. The data Coeff_A is made 0 (zero) when in the irreversible transform mode.

The 2-bit rightward shift circuit 32 makes an arithmetic 2-bit rightward shift calculation of the output (32 bits) from the adder 31.

The integer extraction circuit 33 is provided to extract a code bit and integer part of the output (32 bits) from the 2-bit rightward shift circuit 32. Namely, the integer extraction circuit 33 extracts upper 20 bits from the output of the 2-bit rightward shift circuit 32.

The decimal fraction extraction circuit 34 extracts a decimal part of the output (32 bits) from the 2-bit rightward shift circuit 32. Namely, the decimal fraction extraction circuit 33 extracts lower 12 bits from the output of the 2-bit rightward shift circuit 32.

The AND circuit 35 is provided to AND the 12-bit data extracted by the decimal fraction extraction circuit 34 and data Coeff_B. The data Coeff_B is a coefficient generated by the coefficient generation module 15. The data Coeff_B is made 0 (zero) when in the reversible transform mode, and "0xfff" (12-bit data) as a hexadecimal notation when in the irreversible transform mode. Namely, the AND circuit 35 outputs the data extracted by the decimal fraction extraction circuit 33 as 0 (zero) when in the reversible transform mode, and the data extracted by the decimal fraction extraction circuit 33 as it is when in the irreversible transform mode.

The synthesis circuit 36 combines the output data from the integer extraction circuit 33 and output data from the AND circuit 35 together. More specifically, the synthesis circuit 36 generates output data of 32 bits in which the output data from the integer extraction circuit 33 (20 bits) are taken as code bits and an integer part and the output data from the AND circuit 35 is taken as a decimal part.

The function-A module 11 delivers the output data from the synthesis circuit 36 as output data (Aout) therefrom at an output terminal Aout.

Therefore, the function-A module 11 makes a fixed-point calculation given by the following equation (A-1) when in the reversible transform mode, and by the following equation (A-2) when in the irreversible transform mode:

$$A\text{out} = \text{RoundOff}\{A\text{in}0 + A\text{in}1 + 0\text{x}2000)\text{>>}2\} \quad (A\text{-}1)$$

$$A\text{out} = 0.25*(A\text{in}0 + A\text{in}1) \quad (A\text{-}2)$$

where X>>Y indicates an arithmetic Y-bit rightward shift of X (binary value) and RoundOff(X) indicates a round-off of a decimal part of the value X.

Function-B Module

Figure 14:
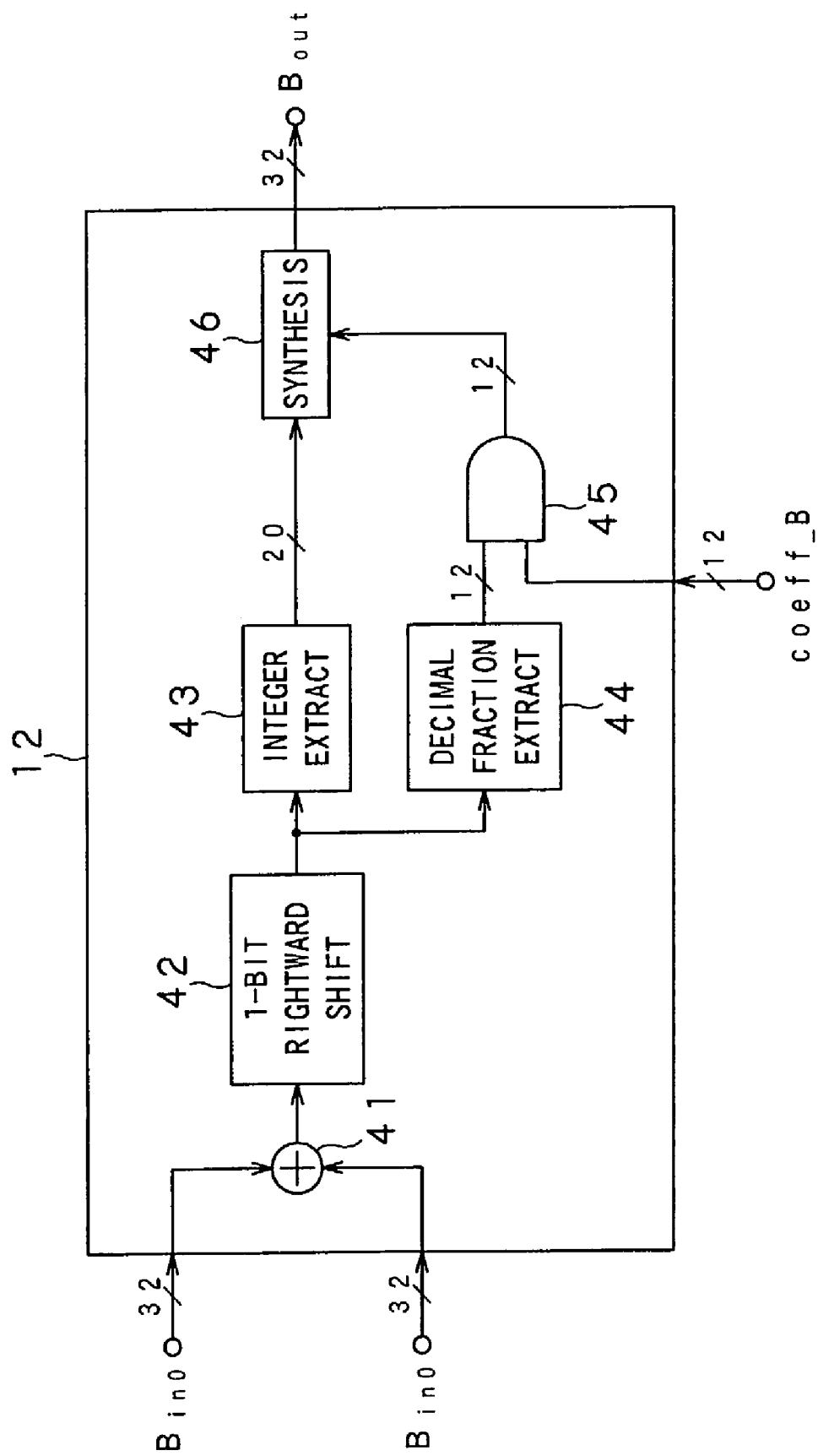
FIG. 14 is a circuit diagram of a function-B circuit.
Figure 15:
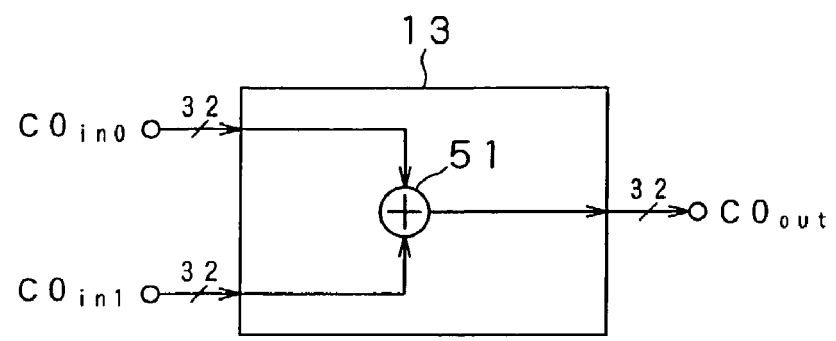
FIG. 15 is a circuit diagram of a function-$C_0$ module.

The function-B module 12 is internally constructed as shown in the circuit diagram in FIG. 14.

The function-B module 12 includes an adder 41, 1-bit rightward shift circuit 42, integer extraction circuit 43, decimal fraction extraction circuit 44, AND circuit 45 and a synthesis circuit 46.

The function-B module 12 has terminals Bin0, Bin1 and Coeff_B to which data Bin0, bin1 and Coeff_B are externally supplied, respectively. Each of the data Bin0 and Bin1 is a 32 bit-long data. The data Coeff_B is a 12 bit-long data.

The adder 41 adds the data Bin0 and Bin1 together to provide 32-bit data. That is, the adder 41 makes an addition of (Bin0+Bin1).

The 1-bit rightward shift circuit 42 makes an arithmetic 1-bit rightward shift calculation of the output (32 bits) from the adder 41.

The integer extraction circuit 43 is provided to extract a code bit and integer part of the output (32 bits) from the 1-bit rightward shift circuit 42. Namely, the integer extraction circuit 43 extracts upper 20 bits from the output from the 1-bit rightward shift circuit 42.

The decimal fraction extraction circuit 44 extracts a decimal part of the output (32 bits) from the 1-bit rightward shift circuit 42. Namely, the decimal fraction extraction circuit 43 extracts lower 12 bits from the output of the 1-bit rightward shift circuit 42.

The AND circuit 45 is provided to AND the 12-bit data extracted by the decimal fraction extraction circuit 44 and data Coeff_B. The data Coeff_B is a coefficient generated by the coefficient generation module 15. The data Coeff_B is made 0 (zero) when in the reversible transform mode, and "0xfff" (12-bit data) as a hexadecimal notation when in the irreversible transform mode. Namely, the AND circuit 45 outputs the data extracted by the decimal fraction extraction circuit 43 as 0 (zero) when in the reversible transform mode, and the data extracted by the decimal fraction extraction circuit 33 as it is when in the irreversible transform mode.

The synthesis circuit 46 combines the output data from the integer extraction circuit 33 and output data from the AND circuit 45 together. More specifically, the synthesis circuit 36 generates output data of 32 bits in which the output data from the integer extraction circuit 33 (20 bits) is taken as code bits and an integer part and the data extracted by the output data from the AND circuit 45 is taken as a decimal part.

The function-B module 12 delivers output data from the synthesis circuit 46 as the output data (Bout) therefrom at an output terminal Bout.

Therefore, the function-B module 12 makes a fixed-point calculation expressed by the following equation (B-1) when in the reversible transform mode, and by the following equation (B-2) when in the irreversible transform mode:

$$B\text{out} = \text{RoundOff}\{(B\text{in}0 + B\text{in}1)\text{>>}1\} \quad (B\text{-}1)$$

$$B\text{out} = 0.5*(B\text{in}0 + B\text{in}1) \quad (B\text{-}2)$$

where X>>Y indicates an arithmetic Y-bit rightward shift of X (binary value) and RoundOff(X) indicates a round-off of a decimal part of the value X.

Function-$C_0$ Module

The function-$C_0$ module 13 is internally constructed as will be described below. FIG. 13 shows the circuit diagram of the function-$C_0$ module 13.

The function-$C_0$ module 13 is constructed including an adder 51. The function-$C_0$ module 13 has terminals C0in0 and C0in1 to which data C0in0, C0in1 are externally supplied, respectively. Each of the data C0in0 and C0in1 is a 32 bit-long data.

The adder 51 adds the data C0in0 and C0in1 together to provide 32-bit data. That is, the adder 51 makes an addition of (Cin0+Cin1).

The function-$C_0$ module 13 delivers the output data from the adder 51 as the output data (C0out) thereof at a terminal C0out.

Therefore, the function-$C_0$ module 13 makes a fixed-point calculation given by the following equation (C0-1):

$$C0\text{out} = C0\text{in}0 + C1\text{in}1 \quad (C0\text{-}1)$$

Function-$C_1$ Module

Figure 16:
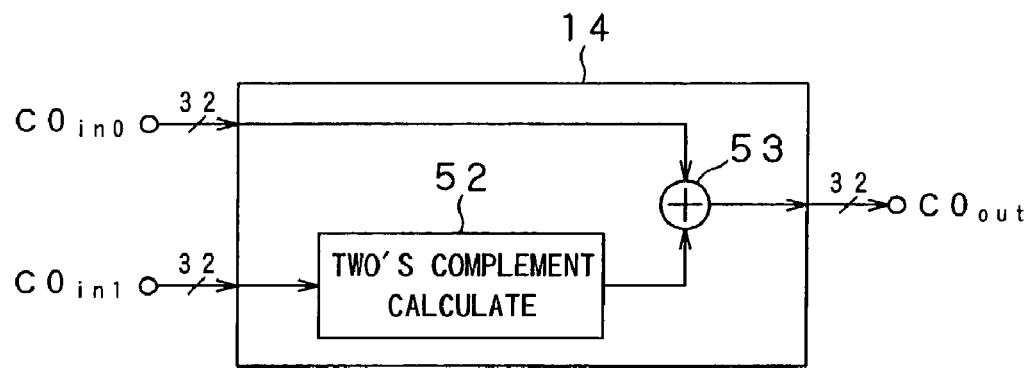
FIG. 16 is a circuit diagram of a function-$C_1$ module.

The function-$C_1$ module 14 is internally constructed as will be described below. The internal construction of the function-$C_1$ module 14 is shown in the circuit diagram of FIG. 16.

The function-$C_1$ module 14 is constructed including a two's complement calculation circuit 52 and an adder 53.

The function-$C_1$ module 14 has terminals C1in0 and C1in1 to which data C1in0, C1in1 are externally supplied, respectively. Each of the data C1in0 and C1in1 is a 32 bit-long data.

The two's complement calculation circuit 52 calculates a two's complement of C1in1. The adder 53 adds the output from the two's complement calculation circuit 52 and data C1in0 together to provide 32-bit data. That is, the two's complement calculation circuit 52 and adder 53 make a subtraction of (C0in0−C0in1).

The function-$C_1$ module 14 delivers the output data from the adder 53 as the output data (C1out) thereof at a terminal C1out.

Therefore, the function-$C_0$ module 13 makes a fixed-point calculation expressed by the following equation (C1-1):

$$C1out = C0in0 + C1in1 \qquad (C1\text{-}1)$$

Coefficient Generation Module

Figure 17:
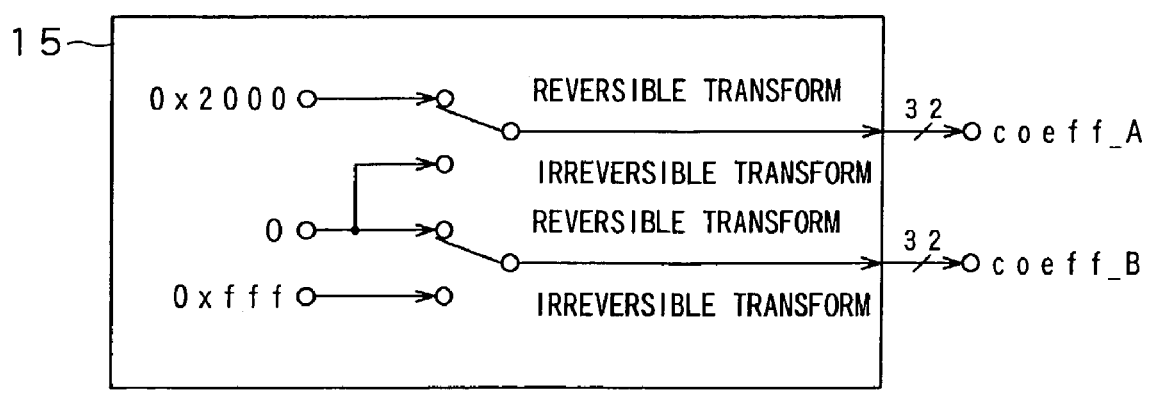
FIG. 17 is a circuit diagram of a coefficient generation module.

The coefficient generation module 15 is internally constructed as will be described below with reference to the circuit diagram of FIG. 17.

The coefficient generation module 15 generates coefficients Coeff_A and Coeff_B. The coefficient Coeff_A is a 32-bit data, and data Coeff_B is a 12-bit data. The coefficient Coeff_B has a bit length corresponding to the decimal-part data length dealt with in this apparatus. The coefficients Coeff_A and Coeff_B are switched between them under the control of an external controller for example. The coefficients Coeff_A and Coeff_B are different in value when in the reversible transform mode and when in the irreversible transform mode, as follows:

Reversible Transform Mode Coeff_A=0×2000 (in hexadecimal notation; "2" in decimal notation) Coeff_B=0

Irreversible Transform Mode Coeff_A=0 Coeff_B=0×fff (in hexadecimal notation)

Selectors

The selectors will be described below.

The aforementioned modules are connected to each other via the first to seventh selectors 21 to 27. Each of the first to seventh selectors 21 to 27 has two input terminals "0" and "1" and one output terminal. That is, each of the first to seventh selectors 21 to 27 selects and supplies either of signals supplied to the two input terminals thereof.

Each of the first to sixth selectors 21 to 26 has the two input terminals thereof switched between them between when in the forward transform mode and when in the inverse transform mode. The input terminal "0" is selected when in the forward transform mode, and the input terminal "1" is selected when the inverse transform mode. The seventh selector 27 is used for the stream-bottom data dilation. More specifically, the seventh selector 27 has the input terminal "1" thereof selected when the wavelet transform is the forward one and the total number of original data in the original data stream is odd, and when the wavelet transform is the inverse one and the total number of original data in the original data stream is even. The seventh selector 27 has the input terminal "0" thereof selected in other cases.

Flip-Flops

Each of the first to third flip-flops 28, 29 and 30 delays data supplied to the input terminal thereof by one clock and delivers the thus delayed data from the output terminal thereof.

Connection of the Modules

Next, the aforementioned modules are connected to one another as will be described with reference to FIG. 12.

The terminal $I_0$ is connected to the input terminal of the first flip-flop 28 and input terminal "1" of the seventh selector 27. The output terminal of the first flip-flop 28 is connected to the input terminal "0" of the first selector 21 and input terminal "1" of the third selector 23.

The terminal $I_1$ is connected to the input terminal "1" of the first selector 21, input terminal "0" of the third selector 23 and to the input terminal of the second flip-flop 29. The output terminal of the second flip-flop 29 is connected to the terminal C0in0 of the function-$C_0$ module 13.

The terminal $I_2$ is connected to the terminal C1in0 of the function-$C_1$ module 14.

The terminal $I_3$ is connected to the input terminal "1" of the second selector 22 and input terminal "0" of the fourth selector 24.

The output terminal of the first selector 21 is connected to the terminal Aout of the function-A module 11. The output terminal of the second selector 22 is connected to the terminal Ain1 of the function-A module 11. The output terminal of the third selector 23 is connected to the terminal Bin0 of the function-B module 12. The output terminal of the fourth selector 24 is connected to the terminal Bin1 of the function-B module 12.

The terminal Aout of the function-A module 11 is connected to the input terminal "0" of the fifth selector 25 and input terminal "1" of the sixth selector 26. The terminal Bout of the function-B module 12 is connected to the input terminal "1" of the fifth selector 25 and input terminal "0" of the sixth selector 26.

The output terminal of the fifth selector 25 is connected to the terminal C0in1 of the function-$C_0$ module 13. The output terminal of the sixth selector 26 is connected to the terminal C1in1 of the function-$C_1$ module 14.

The terminal C0out of the function-$C_0$ module 13 is connected to the terminal $O_0$. The terminal C1out of the function-$C_1$ module 14 is connected to the terminal $O_1$ and to the input terminal "0" of the seventh selector 27.

The output terminal of the seventh selector 27 is connected to the input terminal of the third flip-flop 30 whose output terminal is connected to the input terminal "0" of the second selector 22 and input terminal "1" of the fourth selector 24.

The coefficient Coeff_A generated by the coefficient generation module 15 is supplied to the terminal Coeff_A of the function-A module 11. The coefficient Coeff_B generated by the coefficient generation module 15 is supplied to the terminal Coeff_B of the function-A module 11 and terminal Coeff_B of the function-B module 12.

Operations for the Forward Transform

The operations made for the forward transform will be described herebelow:

When in the forward transform mode, the wavelet transform apparatus 1 makes the 5×3 forward filtering computation to generate one high-frequency coefficient and one low-frequency coefficient at every pass of operations. The wavelet transform apparatus 1 has been supplied with each data in the original data stream and a high-frequency data stream already generated by a preceding pass, that have been selected by the external controller. The external controller steps data in the original data stream two by two per pass from first to last data for supply to the wavelet transform apparatus 1 which will thus generate a high-frequency data stream and low-frequency data stream.

When in the forward transform mode, each of the first to sixth selectors 21 to 26 is switched by the external controller to the input terminal "0" thereof. When in the forward transform mode, the wavelet transform apparatus 1 is supplied at the terminal $I_0$ thereof with $d_{n-1}^f$, at the terminal $I_1$ with $s_n{}^s$, at the terminal $I_2$ with $d_n{}^s$ and terminal $I_3$ with $s_{n+1}{}^s$ under the control of the external controller.

As a result, the wavelet transform apparatus 1 will provide the following results of calculation when in the reversible transform mode:

$$s_n{}^f = s_n{}^s + \{(d_{n-1}{}^f + d_n{}^f + 2) >> 2\}$$

$$d_n{}^f = d_n{}^s - \{(s_n{}^s + s_{n+1}{}^s) >> 1\}$$

When in the irreversible transform mode, the wavelet transform apparatus 1 will provide the following results of calculation:

$$s_n{}^f = s_n{}^s + 0.25 \times (d_{n-1}{}^f + d_n{}^f)$$

$$d_n{}^f = d_n{}^s - 0.5 \times (s_n{}^s + s_{n+1}{}^s)$$

The wavelet transform apparatus 1 will deliver a calculation result $s_n{}^f$ at the terminal $O_0$ thereof, and a calculation result $d_n{}^f$ at the terminal $O_1$.

Figure 18:
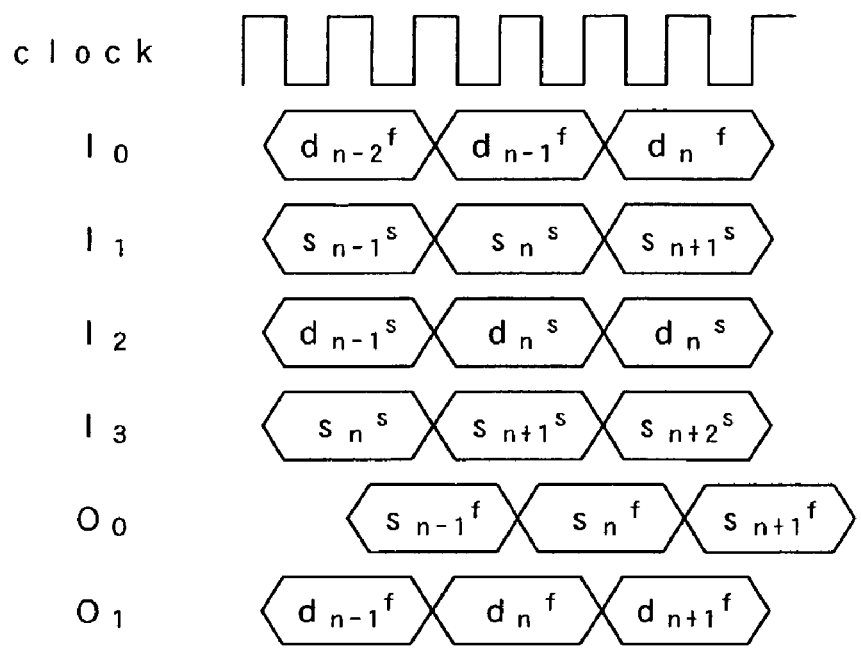
FIG. 18 is a timing diagram of input and output data during an ordinary operation for the forward transform.

FIG. 18 is a timing diagram of input and output data during an ordinary operation for the forward transform. As shown in FIG. 18, the wavelet transform apparatus 1 makes one pass of operations with two clocks. With a first clock in one pass, the function-B module 12 and function-$C_1$ module 14 are put into operation, and with a second clock, the function-A module 11 and function-$C_0$ module 13 are put into operation.

Figure 19:
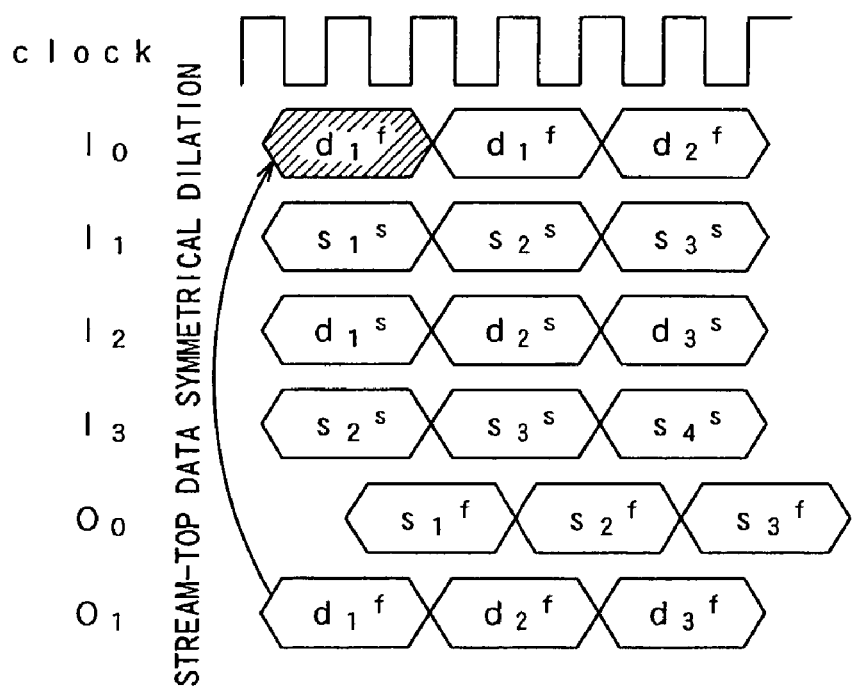
FIG. 19 is a timing diagram of input and output data when the stream-top data symmetrical dilation is done in the forward transform.

FIG. 19 is a timing diagram of input and output data for generating a first coefficient ($s_1{}^f$) in the low-frequency data stream. As shown in FIG. 19, the first low-frequency data ($s_1{}^f$) is transformed with the second clock in the first pass. At this time, the external controller extracts the first high-frequency data ($d_1{}^f$) supplied from the terminal $O_1$ with the first clock, and supplies it to the terminal $I_0$. Thus, it is possible to make the stream-top data symmetrical dilation during the forward transform.

Figure 20:
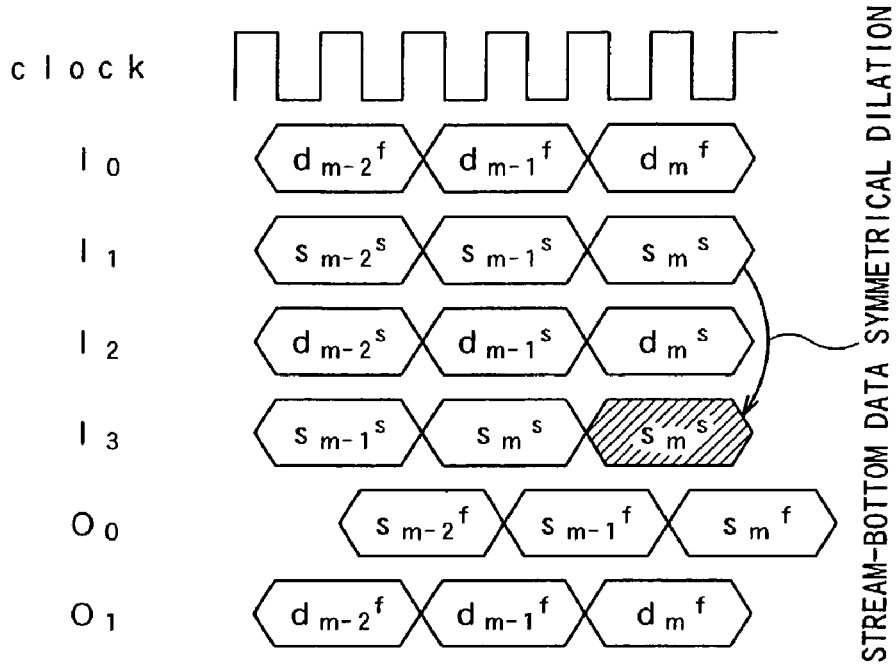
FIG. 20 is a timing diagram of input and output data when the stream-bottom data symmetrical dilation is done in the forward transform of an even total number of original data.

FIG. 20 is a timing diagram of input and output data for generating a last high-frequency coefficient ($d_m{}^f$) in the high-frequency data stream using the original data stream whose total number of pixel data is even. As shown in FIG. 20, the last high-frequency coefficient ($d_m{}^f$) is transformed with the first clock in the last pass. At this time, the external controller supplies the terminal $I_3$ as well with the original data ($s_m{}^s$) for supply to the terminal $I_1$. Thus, it is possible to make the stream-bottom data symmetrical dilation during the forward transform mode when the total number of pixel data in the original data stream is even.

Figure 21:
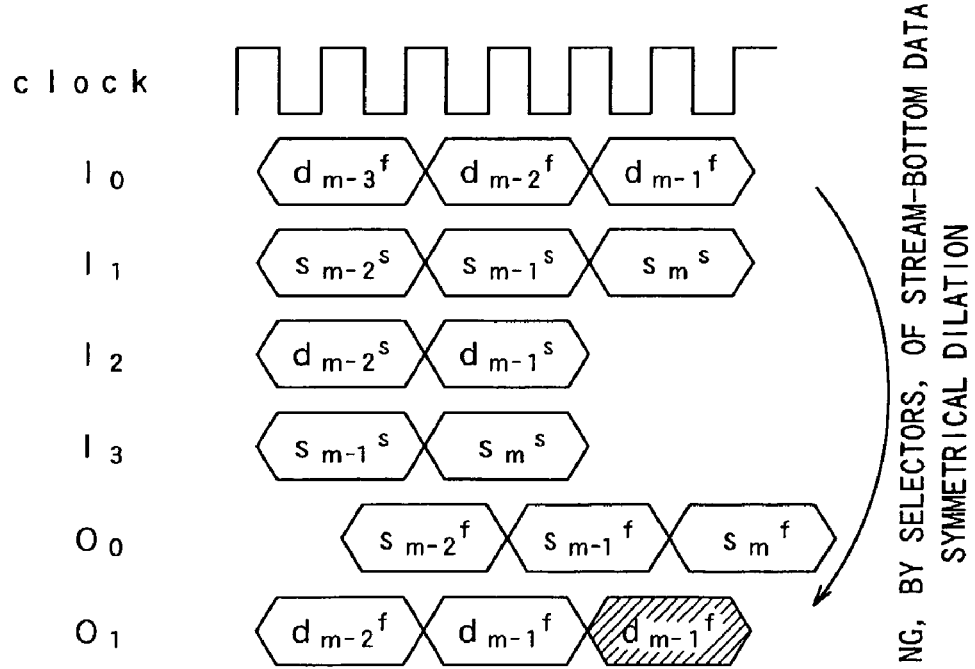
FIG. 21 is a timing diagram of input and output data when the stream-bottom data symmetrical dilation is done in the forward transform of an odd total number of original data.

FIG. 21 is a timing diagram of input and output data for generating a last low-frequency coefficient ($s_m{}^f$) in the low-frequency data stream using an original data stream whose total number of pixel data is odd. As shown in FIG. 21, the last low-frequency coefficient ($s_m{}^f$) is transformed with the second clock in the last pass (not that no data will be generated with the first clock in the last pas; there exists no $O_1$). At this time, the seventh selector 27 has the input terminal "1" thereof switched by the external controller to a high-frequency coefficient ($d_{m-1}{}^f$) for supply to the terminal $I_0$ in place of data supplied from the output terminal $O_1$. Thus, it is possible to the stream-bottom data symmetrical dilation during the forward transform mode when the total number of pixel data in the original data stream is odd.

Operations for the Inverse Transform

The operations made when in the forward transform mode will be described herebelow:

When in the inverse transform mode, the wavelet transform apparatus 1 makes one pass of operations with two clocks. With a first clock in one pass, the function-B module 12 and function-$C_1$ module 14 are put into operation for the wavelet transform computation, and with the second clock, the function-A module 11 and function-$C_0$ module 13 are put into operation for the wavelet transform computation.

When in the inverse transform mode, the wavelet transform apparatus 1 makes the 5×3 inverse filtering computation to generate two original image data at every pass of operations. The wavelet transform apparatus 1 is supplied with each data in low- and high-frequency data streams and each data in the original data stream already generated by a preceding pass, that have been selected by the external controller. The external controller steps data in the low- and high-frequency data streams one by one per pass from first to last data for supply to the wavelet transform apparatus 1 which will thus generate the original data stream.

For the inverse transform, each of the first to sixth selectors 21 to 26 is switched by the external controller to the input terminal "1" thereof.

When in the inverse transform mode, the wavelet transform apparatus 1 is supplied at the terminal $I_0$ thereof with $s_n{}^s$, at the terminal $I_1$ with $d_n{}^f$, at the terminal $I_2$ with $s_{n+1}{}^f$ and terminal $I_3$ with $d_{n+1}{}^f$ under the control of the external controller.

As a result, the wavelet transform apparatus 1 will provide the following results of calculation when in the reversible transform mode:

$$d_n{}^s = d_n{}^f + \{(s_n{}^s + s_{n+1}{}^s) >> 1\}$$

$$s_{n+1}{}^s = s_{n+1}{}^f - \{(d_n{}^f + d_{n+1}{}^f + 2) >> 2\}$$

When in the irreversible transform mode, the wavelet transform apparatus 1 will provide the following results of calculation:

$$d_n{}^s = d_n{}^f + 0.5 \times (s_n{}^s + s_{n+1}{}^s)$$

$$s_{n+1}{}^s = s_{n+1}{}^f - 0.25 \times (d_n{}^f + d_{n+1}{}^f)$$

The wavelet transform apparatus 1 will deliver a calculation result $d_n{}^s$ at the terminal $O_0$ thereof, and a calculation result $s_{n+1}{}^s$ at the terminal $O_1$.

Figure 22:
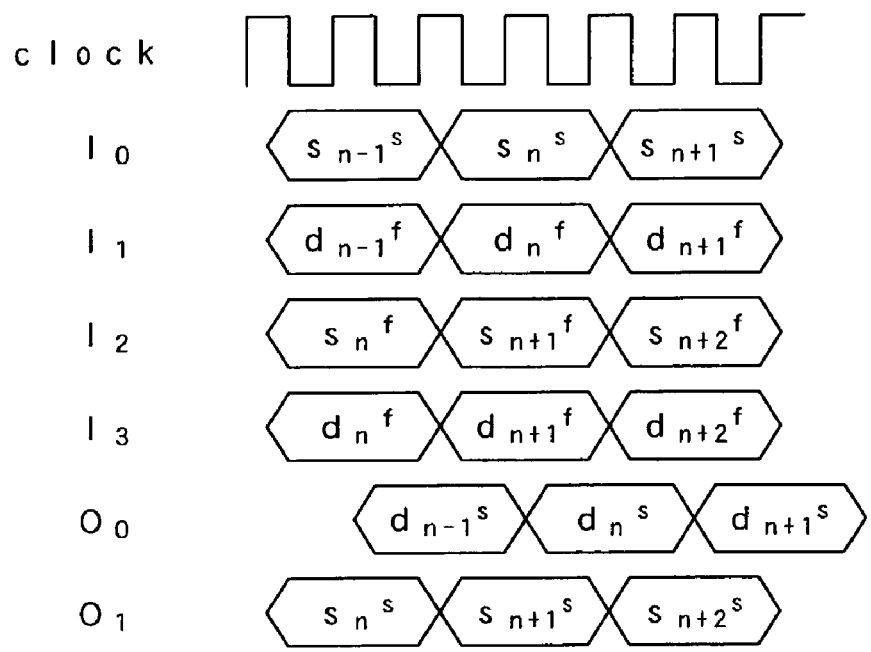
FIG. 22 is a timing diagram of ordinary input and output data in the inverse transform.

FIG. 22 is a timing diagram of input and output data during an ordinary operation when in the inverse transform mode. As shown in FIG. 22, the wavelet transform apparatus 1 makes one pass of operations with two clocks. With a first clock in one pass, the function-A module 11 and function-$C_1$ module 14 are put into operation, and with a second clock, the function-B nodule 12 and function-$C_0$ module 13 are put into operation.

Figure 23:
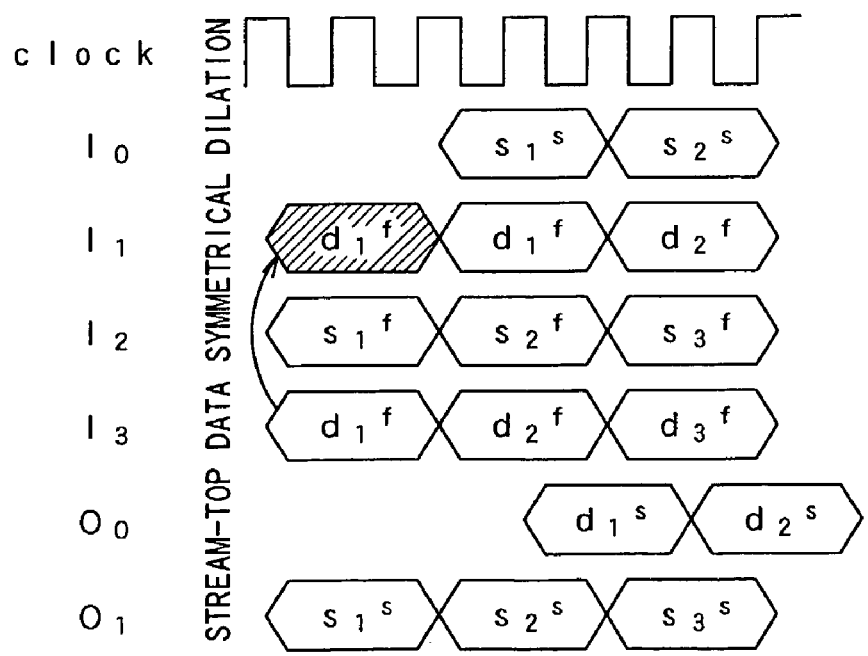
FIG. 23 is a timing diagram of input and output data when the stream-top data symmetrical dilation is done in the inverse transform.

FIG. 23 is a timing diagram of input and output data for generating a first coefficient ($s_1{}^s$) in the original data stream. As shown in FIG. 23, the first original data ($s_1{}^s$) is transformed with the first clock in the first pass (note that no data will be generated with the second clock in the first pass). At this time, the external controller supplies the original data ($d_1{}^f$) for supply to the terminal $I_3$ to the terminal $I_1$ as well. Thus, it is possible to make the stream-top data symmetrical dilation during the inverse transform mode.

Figure 24:
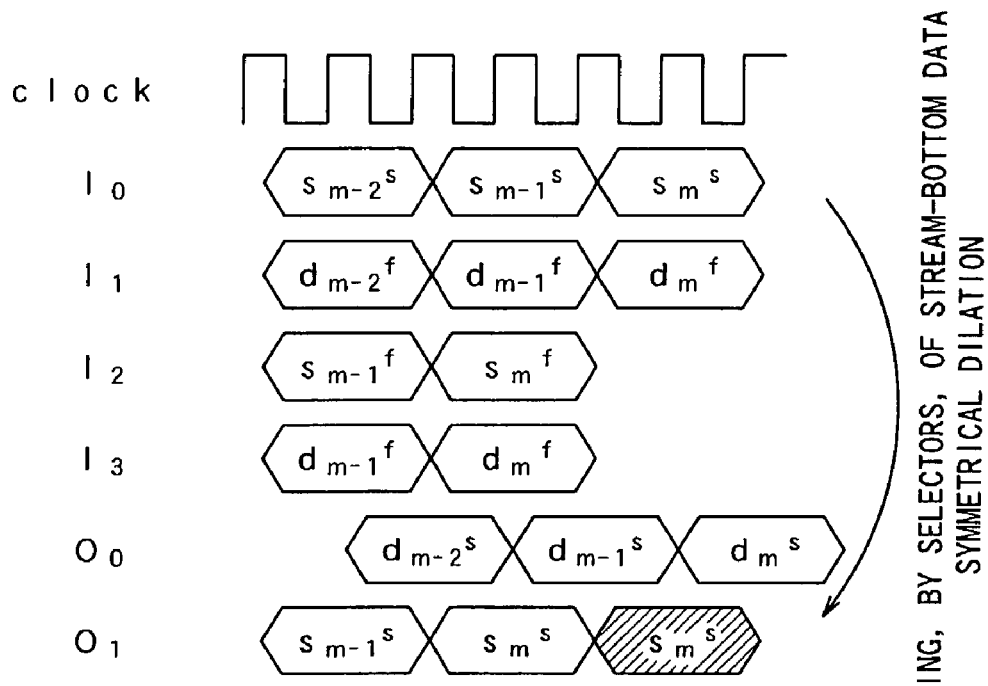
FIG. 24 is a timing diagram of input and output data when the stream-bottom data symmetrical dilation is done in the inverse transform of an even total number of original data.

FIG. 24 is a timing diagram of input and output data for generating a last original data ($d_m{}^s$) for generating an original data stream whose total number of pixel data is even. As shown in FIG. 24, the last original data ($d_m{}^s$) undergoes a wavelet transform with the second clock in the last pass. (Note that there exists no output data ($O_1$) at the first clock in the last pass.) At this time, the external controller switches the seventh selector 27 to the input terminal "1" and supplies the input terminal "1" with the original data ($s_m{}^s$) for supply to the terminal $I_0$ in place of data delivered at the output terminal $O_1$. Thus, it is possible to make the stream-bottom data symmetrical dilation during the inverse transform when the total number of pixel data in the original data stream is even.

Figure 25:
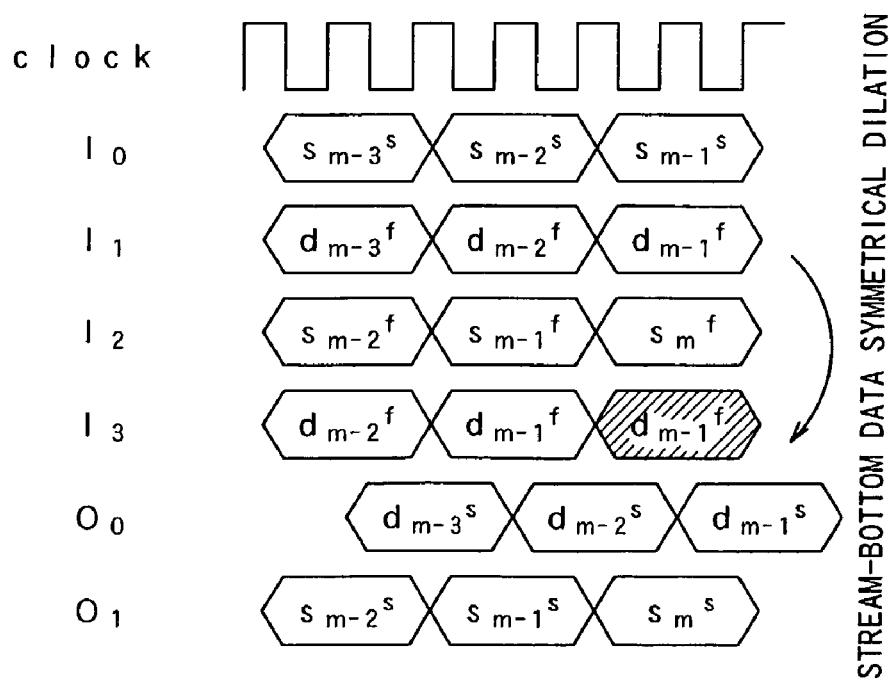
FIG. 25 is a timing diagram of input and output data when the end symmetrical dilation is done in the inverse transform of an odd total number of original data.

FIG. 25 is a timing diagram of input and output data for generating a last original data ($s_m^s$) for generating an original data stream whose total number of pixel data is odd. As shown in FIG. 25, the last original data ($s_m^s$) undergoes a wavelet transform with the first clock in the last pass. At this time, the external controller will supply a high-frequency coefficient ($d_{m-1}^f$) for supply to the terminal $I_1$ to the terminal $I_3$ as well. Thus, it is possible to the stream-bottom data symmetrical dilation during the inverse transform mode when the total number of pixel data in the original data stream is odd.

As having been described in the foregoing, in the wavelet transform apparatus 1, the filtering computation block consists of the function-A module 11, function-B module 12, function-$C_0$ module 13 and the function-$C_1$ module 14, whose connection to each other is switched by the selectors depending upon whether the wavelet transform going to be done is a forward or inverse one. Thus, the circuitry scale of the wavelet transform apparatus 1 is very small.

More particularly, in the wavelet transform apparatus 1, the filtering computation block consists of the above function modules and the function modules are combined for either the forward or inverse transform to make the filtering computation.

| | |
|---|---|
| Function-A module 11: | (Ain0 + Ain1 + Coeff_A) >> 2 |
| Function-B module 12: | (Bin0 + Bin1)$_2$ >> 1 |
| Function-C0 module 13: | C0in0 + C0in1 |
| Function-C1 module 14: | C1in0 − C1in1 |

Also, in the wavelet transform apparatus 1, the coefficient Coeff_A generated by the coefficient generation module 15 for supply to the function-A module 11 and the coefficient Coeff_B which determines whether or not the decimal part of the output result from the function-A module 11 and function-B module 12 is to be deleted or kept are switched between when in the reversible transform mode and when in the irreversible transform mode. Thus, the wavelet transform apparatus 1 can make both the reversible transform and irreversible transform by the single filtering computation module, which leads to an extremely small scale of the circuitry.

Figure 26:
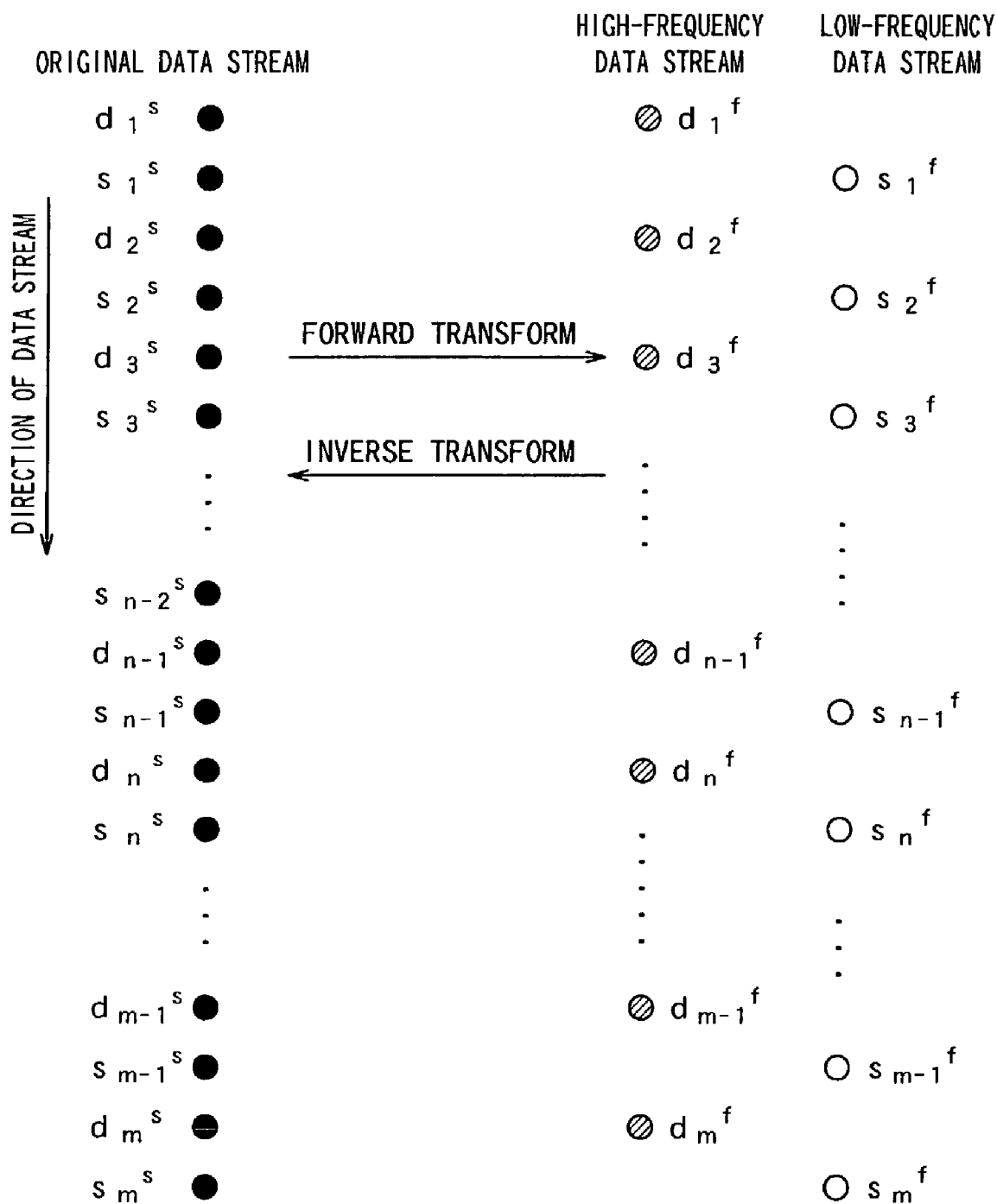
FIG. 26 explains the wavelet transform when data have been filtered in a phase sequence from the high- to low-frequency coefficient.

Note that in the wavelet transform apparatus 1 according to the present invention, low- and high-frequency coefficients are generated in the phase sequence from the low- to high-frequency as shown in FIG. 1 but the present invention is not limited to this phase sequence but the coefficients may be generated in a phase sequence from high- to low-frequency as shown in FIG. 26.

In this case, the sequence of data in the original data stream and low-frequency data stream, supplied to and from the wavelet transform apparatus 1, that is, the value of the subscript n to each data, is a one having been described in the aforementioned wavelet transform apparatus 1 plus one.

Assume here that a position (sequence) in the original data stream to which an original data belongs is L, a position (sequence) in the high-frequency data stream to which a high-frequency coefficient belongs is M and a position (sequence) in the low-frequency data stream to which a low-frequency coefficient belongs is N (L, M and N are integers).

In the aforementioned wavelet transform apparatus 1, L, M and N and the subscript n are in the following relation:

$$2n=L=2M=2N$$

For the filtering computation in the phase sequence from high- to low-frequency coefficient, L, M and N and the subscript n are in the following relation:

$$2n=(L+1)=2M=2(N+1)$$

Also, for the filtering computation in the phase sequence from high- to low-frequency coefficient, the stream-top data symmetrical dilation to be done because there exists no high-frequency coefficient should be done using a high-frequency coefficient one high-frequency coefficient after the absent high-frequency coefficient. Similarly, the stream-top data symmetrical dilation to be done because there exists no original data should be done using original data two original data after the absent original data.

Also, for the filtering computation in the phase sequence from high- to low-frequency coefficient, the stream-bottom data symmetrical dilation to be done because there exists no high-frequency coefficient should be done using a high-frequency coefficient following the absent high-frequency coefficient. Similarly, the stream-bottom data symmetrical dilation to be done because there exists no original data should be done using original data two original data after the absent original data.

In the 5×3 wavelet transform apparatus according to the present invention, the connection between the computation means is switched between when in the forward transform mode and when in the inverse transform mode. Thus, the circuitry scale of the 5×3 wavelet transform apparatus according to the present invention can be reduced.

Also, in the 5×3 wavelet transform apparatus according to the present invention, it is selected to delete or keep the coefficient Coeff_A for supply to the first computation means and the decimal part of the output results from the first and second computation means between the reversible transform and irreversible transform. Thus, in the 5×3 wavelet transform apparatus according to the present invention, the single computation means can be used to make both the reversible transform and irreversible transform, which leads to a reduced circuitry scale.

What is claimed is:

1. A 5×3 wavelet transform apparatus for making a forward transform of an original data stream composed of a plurality of original data by breaking down the original data stream into a low-frequency data stream including low-frequency components of the original data stream and a high-frequency data stream including high-frequency components of the original data stream, as well as for making an inverse transform of the low- and high-frequency data streams by reversing the forward transform, the apparatus comprising:

a first computation means supplied with data Ain0 and Ain1 to determine data Amiddle by computing an equation (1) Amiddle=(Ain0+Ain1+Coeff_A)$_2$>>2, generate data Aout with the decimal part of the data Amiddle taken as zero (0) and output the data Aout;

a second computation means supplied with data Bin0 and Bin1 to determine data Bmiddle by computing an equation (2) Bmiddle=(Bin0+Bin1)$_2$>>1, generate data Bout with the decimal part of the data Bmiddle taken as zero (0) and output the data Bout;

a third computation means supplied with data C0in0 and C0in1 to determine data C0out by computing an equation (3) C0out=(C0in0+C0in1), and output the data C0out; and a fourth computation means supplied with data C1in0 and C1in1 to determine data C1out by computing an equation (4) C1out=(C1in0−C1in1), and output the data C1out;

for the forward transform:
the apparatus being supplied, in every two steps, with the original data stream from first to last data;
the first computation means being supplied with the (M−1)th data in the high-frequency data stream as the data Ain0 and also the output data C1out from the fourth computation means as the data Ain1;
the second computation means being supplied with the (L−1)th data in the original data stream as the data Bin0 and also the (L+1)th data in the original data stream as the data Bin1;
the third computation means being supplied with the (L−1)th data in the original data stream as the data C0in0 and also the output data Aout from the first computation means as the data C0in1;
the fourth computation means being supplied with the L-th data in the original data stream as the data C1in0 and also the output data Bout from the second computation means as the data C1in1; and
the apparatus outputting the output data C1out from the fourth computation means as the M-th data in the high-frequency data stream and also the output data C0out from the third computation means as the N-th data in the low-frequency data stream; and for the inverse transform:
the apparatus being supplied, in each step, with the low- and high-frequency data streams from first to last data;
the first computation means being supplied with the M-th data in the high-frequency data stream as the data Ain0 and also the (M+1)th data in the high-frequency data stream as the data Ain1;
the second computation means being supplied with the (L−1)th data in the original data stream as the data Bin0 and also the output data C1out from the fourth computation means as the data Bin1;
the third computation means being supplied with the M-th data in the high-frequency data stream as the data C0in0 and also the output data Bout from the second computation means as the data C0in1;
the fourth computation means being supplied with the (N+1)th data in the low-frequency data stream as the data C1in0 and also the output data Aout from the first computation means as the data C1in1; and
the apparatus outputting the data C1out from the third computation means as the L-th data in the original data stream and also the output data C1out from the fourth computation means as the (L+1)th data in the original data stream; and where $X_Y$ is a notation of X by a numeration based on Y, and $X_2 >> Y$ indicates an arithmetic Y-bit rightward shift of X (binary number);
Coeff_A is 2 (decimal number); and
the values L, M and N being integers having a relation of {L=2M=2N} or {(L+1)=2M=2(N+1)} with each other.

2. The apparatus as set forth in claim 1, wherein:
for the forward transform, when there exists no (M−1)th data in the high-frequency data stream, the first computation means is supplied with the M-th data in the high-frequency data stream as the data Ain0.

3. The apparatus as set forth in claim 1, wherein:
for the forward transform, when there exists no (L−1)th data in the original data stream, the second computation means is supplied with the (L+1)th data in the original data stream as the data Bin0.

4. The apparatus as set forth in claim 1, wherein:
for the inverse transform, when there exists no M-th data in the high-frequency data stream, the first computation means is supplied with the (M+1)th data in the high-frequency data stream as the data Ain0.

5. The apparatus as set forth in claim 1, wherein:
for the inverse transform, when there exists no (L−1)th data in the original data stream, the second computation means is supplied with the (L+1)th data in the original data stream as the data Bin0.

6. The apparatus as set forth in claim 1, wherein:
for the forward transform, when there exists no output data C1out from the fourth computation means, the first computation means is supplied with the (M−1)th data in the high-frequency data stream as the data Ain1.

7. The apparatus as set forth in claim 1, wherein:
for the forward transform, when there exists no (L+1)th data in the original data stream, the second computation means is supplied with the (L−1)th data in the original data stream as the data Bin1.

8. The apparatus as set forth in claim 1, wherein:
for the inverse transform, when there exists no (M+1)th data in the high-frequency data stream, the first computation means is supplied with the M-th data in the high-frequency data stream as the data Ain1.

9. The apparatus as set forth in claim 1, wherein:
for the inverse transform, when there exists no output data C1out from the fourth computation means, the second computation means is supplied with the (L−1)th data in the original data stream as the data Bin1.

10. A 5×3 wavelet transform apparatus for making a forward transform of an original data stream composed of a plurality of original data by breaking down the original data stream into a low-frequency data stream including low-frequency components of the original data stream and a high-frequency data stream including high-frequency components of the original data stream, as well as for making an inverse transform of the low- and high-frequency data streams by reversing the forward transform, the apparatus comprising:

a first computation means supplied with data Ain0 and Ain1 to determine data Amiddle by computing an equation (1') Amiddle=0.25*(Ain0+Ain1), and output the data Amiddle as the data Aout;

a second computation means supplied with data Bin0 and Bin1 to determine data Bmiddle by computing an equation (2') Bmiddle=0.5*(Bin0+Bin1), and output the data Bmiddle as the data Bout;

a third computation means supplied with data C0in0 and C0in1 to determine data C0out by computing an equation (3) C0out=(C0in0+C0in1), and output the data C0out; and a fourth computation means supplied with data C1in0 and C1in1 to determine data C1out by computing an equation (4) C1out=(C1in0−C1in1), and output the data C1out;

for the forward transform:
the apparatus being supplied, in every two steps, with the original data stream from first to last data;

the first computation means being supplied with the (M−1)th data in the high-frequency data stream as the data Ain0 and also the output data C1out from the fourth computation means as the data Ain1;

the second computation means being supplied with the (L−1)th data in the original data stream as the data Bin0 and also the (L+1)th data in the original data stream as the data Bin1;

the third computation means being supplied with the (L−1)th data in the original data stream as the data C0in0 and also the output data Aout from the first computation means as the data C0in1;

the fourth computation means being supplied with the L-th data in the original data stream as the data C1in0 and also the output data Bout from the second computation means as the data C1in1; and the apparatus outputting the output data C1out from the fourth computation means as the M-th data in the high-frequency data stream and also the output data C0out from the third computation means as the N-th data in the low-frequency data stream; and for the inverse transform:

the apparatus being supplied, in each step, with the low- and high-frequency data streams from first to last data;

the first computation means being supplied with the M-th data in the high-frequency data stream as the data Ain0 and also the (M+1)th data in the high-frequency data stream as the data Ain1;

the second computation means being supplied with the (L−1)th data in the original data stream as the data Bin0 and also the output data C1out from the fourth computation means as the data Bin1;

the third computation means being supplied with the M-th data in the high-frequency data stream as the data C0in0 and also the output data Bout from the second computation means as the data C0in1;

the fourth computation means being supplied with the (N+1)th data in the low-frequency data stream as the data C1in0 and also the output data Aout from the first computation means as the data C1in1; and the apparatus outputting the data C1out from the third computation means as the L-th data in the original data stream and also the output data C1out from the fourth computation means as the (L+1)th data in the original data stream; and the values L, M and N being integers having a relation of {L=2M=2N} or {(L+1)=2M=2(N+1)} with each other.

11. The apparatus as set forth in claim 10, wherein:

for the forward transform, when there exists no (M−1)th data in the high-frequency data stream, the first computation means is supplied with the M-th data in the high-frequency data stream as the data Ain0.

12. The apparatus as set forth in claim 10, wherein:

for the forward transform, when there exists no (L−1)th data in the original data stream, the second computation means is supplied with the (L+1)th data in the original data stream as the data Bin0.

13. The apparatus as set forth in claim 10, wherein:

for the inverse transform, when there exists no M-th data in the high-frequency data stream, the first computation means is supplied with the (M+1)th data in the high-frequency data stream as the data Ain0.

14. The apparatus as set forth in claim 10, wherein:

for the inverse transform, when there exists no (L−1)th data in the original data stream, the second computation means is supplied with the (L+1)th data in the original data stream as the data Bin0.

15. The apparatus as set forth in claim 10, wherein:

for the forward transform, when there exists no output data C1out from the fourth computation means, the first computation means is supplied with the (M−1)th data in the high-frequency data stream as the data Ain1.

16. The apparatus as set forth in claim 10, wherein:

for the forward transform, when there exists no (L+1)th data in the original data stream, the second computation means is supplied with the (L−1)th data in the original data stream as the data Bin1.

17. The apparatus as set forth in claim 10, wherein:

for the inverse transform, when there exists no (M+1)th data in the high-frequency data stream, the first computation means is supplied with the M-th data in the high-frequency data stream as the data Ain1.

18. The apparatus as set forth in claim 10, wherein:

for the inverse transform, when there exists no output data C1out from the fourth computation means, the second computation means is supplied with the (L−1)th data in the original data stream as the data Bin1.

19. A 5×3 wavelet transform apparatus for making a forward transform of an original data stream composed of a plurality of original data by breaking down the original data stream into a low-frequency data stream including low-frequency components of the original data stream and a high-frequency data stream including high-frequency components of the original data stream, as well as for making an inverse transform of the low- and high-frequency data streams by reversing the forward transform, the apparatus comprising:

a first computation means supplied with data Ain0 and Ain1 to determine data Amiddle by computing an equation (1) Amiddle=(Ain0+Ain1+Coeff_A)$_2$>>2, when in a reversible transform mode, while determining the data Amiddle by computing an equation (1") Amiddle=(Ain0+Ain1)$_2$>>2, when in an irreversible transform mode, and output data Aout with the decimal part of the data Amiddle taken as zero (0) when in the reversible transform mode, while outputting the data Amiddle as it is as the data Aout when in the irreversible transform mode;

a second computation means supplied with data Bin0 and Bin1 to determine data Bmiddle by computing an equation (2) Bmiddle=(Bin0+Bin1)$_2$>>1, and output data Bout with the decimal part of the data Bmiddle taken as zero (0) when in the reversible transform mode, while outputting the data Bmiddle as it is as the data Bout when in the irreversible transform mode;

a third computation means supplied with data C0in0 and C0in1 to determine data C0out by computing an equation (3) C0out=(C0in0+C0in1), and output the data C0out; and a fourth computation means supplied with data C1in0 and C1in1 to determine data C1out by computing an equation (4) C1out=(C1in0−C1in1), and output the data C1out;

for the forward transform:

the above 5×3 wavelet transform apparatus being supplied, in every two steps, with the original data stream from first to last data;

the first computation means being supplied with the (M−1)th data in the high-frequency data stream as the data Ain0 and also the data C1out from the fourth computation means as the data Ain1;

the second computation means being supplied with the (L−1)th data in the original data stream as the data Bin0 and also the (L+1)th data in the original data stream as the data Bin1;

the third computation means being supplied with the (L−1)th data in the original data stream as the data C0in0 and also the data Aout from the first computation means as the data C0in1;

the fourth computation means being supplied with the L-th data in the original data stream as the data C1in0 and also the data Bout from the second computation means as the data C1in1; and the apparatus outputting the output data C1out from the fourth computation means as the M-th data in the high-frequency data stream and also the output data C0out from the third computation means as the N-th data in the low-frequency data stream;

for the inverse transform:

the apparatus being supplied, in each step, with the low- and high-frequency data streams from first to last data;

the first computation means being supplied with the M-th data in the high-frequency data stream as the data Ain0 and also the (M+1)th data in the high-frequency data stream as the data Ain1;

the second computation means being supplied with the (L−1)th data in the original data stream as the data Bin0 and also the output data C1out from the fourth computation means as the data Bin1;

the third computation means being supplied with the M-th data in the high-frequency data stream as the data C0in0 and also the output data Bout from the second computation means as the data C0in1;

the fourth computation means being supplied with the (N+1)th data in the low-frequency data stream as the data C1in0 and also the output data Aout from the first computation means as the data C1in1;

the apparatus outputting the data C1out from the third computation means as the L-th data in the original data stream and also the output data C1out from the fourth computation means as the (L+1)th data in the original data stream; and where $X_Y$ is a notation of X by a numeration based on Y, and $X_2$>>Y indicates an arithmetic Y-bit rightward shift of X (binary number); and Coeff_A being 2 (decimal number)

where the values L, M and N are integers having a relation of {L=2M=2N} or {(L+1)=2M=2(N+1)} with each other.

20. The apparatus as set forth in claim 19, wherein:

for the forward transform, when there exists no (M−1)th data in the high-frequency data stream, the first computation means is supplied with the M-th data in the high-frequency data stream as the data Ain0.

21. The apparatus as set forth in claim 19, wherein:

for the forward transform, when there exists no (L−1)th data in the original data stream, the second computation means is supplied with the (L+1)th data in the original data stream as the data Bin0.

22. The apparatus as set forth in claim 19, wherein:

for the inverse transform, when there exists no M-th data in the high-frequency data stream, the first computation means is supplied with the (M+1)th data in the high-frequency data stream as the data Ain0.

23. The apparatus as set forth in claim 19, wherein:

for the inverse transform, when there exists no (L−1)th data in the original data stream, the second computation means is supplied with the (L+1)th data in the original data stream as the data Bin0.

24. The apparatus as set forth in claim 19, wherein:

for the forward transform, when there exists no output data C1out from the fourth computation means, the first computation means is supplied with the (M−1)th data in the original data stream as the data Ain1.

25. The apparatus as set forth in claim 19, wherein:

for the forward transform, when there exists no (L+1)th data in the original data stream, the second computation means is supplied with (L−1)th data in the original data stream as the data Bin1.

26. The apparatus as set forth in claim 19, wherein:

for the inverse transform, when there exists no (M+1)th data in the high-frequency data stream, the first computation means is supplied with the M-th data in the high-frequency data stream as the data Ain1.

27. The apparatus as set forth in claim 19, wherein:

for the inverse transform, when there exists no output data C1out from the fourth computation means, the second computation means is supplied with the (L−1)th data in the original data stream as the data Bin1.

* * * * *